(12) United States Patent
DeBoer et al.

(10) Patent No.: US 11,447,056 B2
(45) Date of Patent: Sep. 20, 2022

(54) WORK VEHICLE WITH SUPPORT DEVICE FOR MOUNTING A COMMODITY TANK AND SUPPORT DEVICE MOUNTING A COMMODITY TANK TO A WORK VEHICLE

(71) Applicant: Deere & Company, Moline, IL (US)

(72) Inventors: Daniel J. DeBoer, Waucom, IA (US); Charles N. Warren, Cedar Falls, IA (US); Jeremy P. L'Heureux, Cedar Falls, IA (US); Steven A. Duppong, Waverly, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/805,137

(22) Filed: Feb. 28, 2020

(65) Prior Publication Data
US 2021/0268954 A1   Sep. 2, 2021

(51) Int. Cl.
*B60P 3/22* (2006.01)
*B62D 65/02* (2006.01)

(52) U.S. Cl.
CPC ............ *B60P 3/2215* (2013.01); *B62D 65/02* (2013.01)

(58) Field of Classification Search
CPC ................ B60P 3/2215; A01M 7/0085; B60K 15/073; B05B 13/005
See application file for complete search history.

(56) References Cited

U.S. PATENT DOCUMENTS 1,472,078 A * 10/1923 Christian ............... B60P 3/2215
                                              280/838
2,660,452 A * 11/1953 Johnson, Jr. ........... A01D 67/00
                                              280/760
(Continued)

FOREIGN PATENT DOCUMENTS

DE         19730825 A1    8/1998
DE     102007046678 A1    4/2009
(Continued)

OTHER PUBLICATIONS

German Search Report issued in counterpart application No. 102020205559.9 dated Mar. 4, 2021 (12 pages).
(Continued)

*Primary Examiner* — Jacob J Cigna
*Assistant Examiner* — Michael W Hotchkiss
(74) *Attorney, Agent, or Firm* — Tucker Ellis LLP

(57) ABSTRACT

A commodity tank support device mounts a commodity tank of a work vehicle on an end portion of a drive axle assembly of the work vehicle. The tank support device includes a main body portion defining an elongate opening extending along an axis of the main body portion and configured to receive the end portion of the drive axle assembly extending through the opening, a first mounting portion defining an axle mounting portion including an axle coupling member configured for selective fastening with a corresponding axle mounting structure on the end portion of the drive axle assembly, and a second mounting portion defining a commodity tank mounting portion of the commodity tank support device including a commodity tank coupling member configured for selective fastening with a corresponding commodity tank mounting structure of the commodity tank of the associated work vehicle.

17 Claims, 23 Drawing Sheets

(56) References Cited

U.S. PATENT DOCUMENTS

| | | | |
|---|---|---|---|
| 2,743,934 A * | 5/1956 | Chambers | A01M 7/0085 280/833 |
| 3,396,983 A * | 8/1968 | Massey | B62D 49/06 280/830 |
| 3,794,131 A | 2/1974 | Freedman et al. | |
| 4,480,845 A | 11/1984 | Hansen | |
| D282,921 S | 3/1986 | Eureka | |
| 4,643,441 A * | 2/1987 | Schartz | A01M 7/0082 224/410 |
| D433,425 S | 11/2000 | Surridge | |
| D435,503 S | 12/2000 | Gukeisen | |
| 6,203,065 B1 * | 3/2001 | Batton | B60K 15/063 280/830 |
| 6,286,870 B1 * | 9/2001 | Mulder | A01M 7/0085 280/830 |
| D441,710 S | 11/2001 | Moehle | |
| 6,550,811 B1 | 4/2003 | Bennett | |
| D484,893 S | 1/2004 | Hsiao | |
| 6,742,612 B2 | 6/2004 | Campbell et al. | |
| D551,153 S | 9/2007 | Oury | |
| D562,350 S | 2/2008 | Higashikawa | |
| D564,431 S | 3/2008 | Orr | |
| D588,054 S | 3/2009 | Xi-Ren | |
| 7,523,804 B2 | 4/2009 | Tanaka et al. | |
| D591,774 S | 5/2009 | Kokitkar et al. | |
| D644,160 S | 8/2011 | Fries | |
| D644,161 S | 8/2011 | Fries | |
| D647,166 S | 10/2011 | Kimball | |
| D655,372 S | 3/2012 | Kimball | |
| D656,520 S | 3/2012 | Ortlund | |
| 8,172,268 B2 | 5/2012 | Komorida et al. | |
| D663,325 S | 7/2012 | Thunstrom | |
| D669,099 S | 10/2012 | Ringer | |
| D694,167 S | 11/2013 | Forsberg | |
| 8,585,064 B2 * | 11/2013 | Ringer | B60K 13/04 280/124.109 |
| D695,202 S | 12/2013 | Forsberg | |
| D713,424 S | 9/2014 | Gonzales | |
| D728,632 S | 5/2015 | Klassen | |
| D728,633 S | 5/2015 | Klassen | |
| D772,773 S | 11/2016 | Andersen | |
| D773,773 S | 11/2016 | Anderson et al. | |
| D775,238 S | 12/2016 | Roemer | |
| 9,586,634 B2 | 3/2017 | Buchanan et al. | |
| D792,479 S | 7/2017 | Sasaki | |
| D795,930 S | 8/2017 | Buckelew et al. | |
| D803,756 S | 11/2017 | Anderson et al. | |
| 9,884,662 B2 | 2/2018 | Eavenson et al. | |
| D825,714 S | 8/2018 | Buckelew et al. | |
| 10,077,145 B1 | 9/2018 | Boucher et al. | |
| D835,683 S | 12/2018 | Zabe | |
| D835,684 S | 12/2018 | Zabe | |
| D837,720 S | 1/2019 | Schwalbe et al. | |
| D837,835 S | 1/2019 | Schwalbe et al. | |
| D872,773 S | 1/2020 | Wise et al. | |
| 10,526,031 B2 | 1/2020 | Freytag | |
| D878,641 S | 3/2020 | Zabe | |
| D887,946 S | 6/2020 | Prater et al. | |
| D890,675 S | 7/2020 | Fellman | |
| D890,816 S | 7/2020 | Parzynski et al. | |
| D891,336 S | 7/2020 | Bering et al. | |
| D900,169 S | 10/2020 | Boone et al. | |
| D901,547 S | 11/2020 | Gade et al. | |
| D901,548 S | 11/2020 | Mossman et al. | |
| D901,549 S | 11/2020 | Baviskar et al. | |
| D901,550 S | 11/2020 | Bjerke et al. | |
| D901,551 S | 11/2020 | Bjerke et al. | |
| D901,552 S | 11/2020 | Bjerke et al. | |
| D903,223 S | 11/2020 | Watson et al. | |
| D903,725 S | 12/2020 | Loew | |
| D903,969 S | 12/2020 | Watson et al. | |
| 2003/0015536 A1 | 1/2003 | Tekulve et al. | |
| 2003/0111501 A1 * | 6/2003 | McGraw | B60G 9/00 224/410 |
| 2007/0272696 A1 | 11/2007 | Kallevig et al. | |
| 2009/0223975 A1 * | 9/2009 | McCallister | B60P 3/2215 220/563 |
| 2013/0048688 A1 * | 2/2013 | Mulder | A01M 7/0085 224/410 |
| 2018/0273142 A1 | 9/2018 | Mangum et al. | |
| 2019/0053422 A1 * | 2/2019 | Holst | A01M 7/0085 |
| 2019/0107089 A1 | 4/2019 | Bykowski | |
| 2019/0183106 A1 * | 6/2019 | Hafvenstein | A01M 7/0082 |
| 2019/0359417 A1 * | 11/2019 | d'Alessandro | B60P 3/2215 |
| 2020/0108714 A1 | 4/2020 | Selvaraj et al. | |
| 2020/0114801 A1 * | 4/2020 | Bering | A01M 7/0085 |
| 2020/0262488 A1 | 8/2020 | Bering et al. | |
| 2020/0262498 A1 | 8/2020 | Bender et al. | |
| 2020/0282826 A1 | 9/2020 | Moore | |
| 2020/0290697 A1 | 9/2020 | Erhard et al. | |
| 2021/0105933 A1 * | 4/2021 | King | A01C 15/006 |

FOREIGN PATENT DOCUMENTS

| | | |
|---|---|---|
| DE | 102009009817 A1 | 8/2010 |
| DE | 102012109085 A1 | 3/2014 |
| DE | 102017201425 A1 | 8/2017 |
| DE | 102017118762 A1 | 2/2019 |
| DE | 102017217391 A1 | 4/2019 |
| EP | 0860350 B1 | 8/2003 |

OTHER PUBLICATIONS

Non-Final Office Action for related U.S. Appl. No. 29/666,463, dated Jun. 25, 2020. 8 pages.

Specification and Figures for related unpublished U.S. application for Vehicle Tank, U.S. Appl. No. 29/666,463, filed Oct. 12, 2018. 8 Pages.

Specification and Figures for related unpublished U.S. application for Fender for Work Vehicle, U.S. Appl. No. 29/680,663, filed Feb. 19, 2019. 21 Pages.

Specification and Figures for related unpublished U.S. application for Commodity Tank for a Work Vehicle, U.S. Appl. No. 29/726,030, filed Feb. 28, 2020. 36 Pages.

German Search Report dated Jun. 23, 2020 for Application Serial No. 102019213708.3 (8 pages).

* cited by examiner

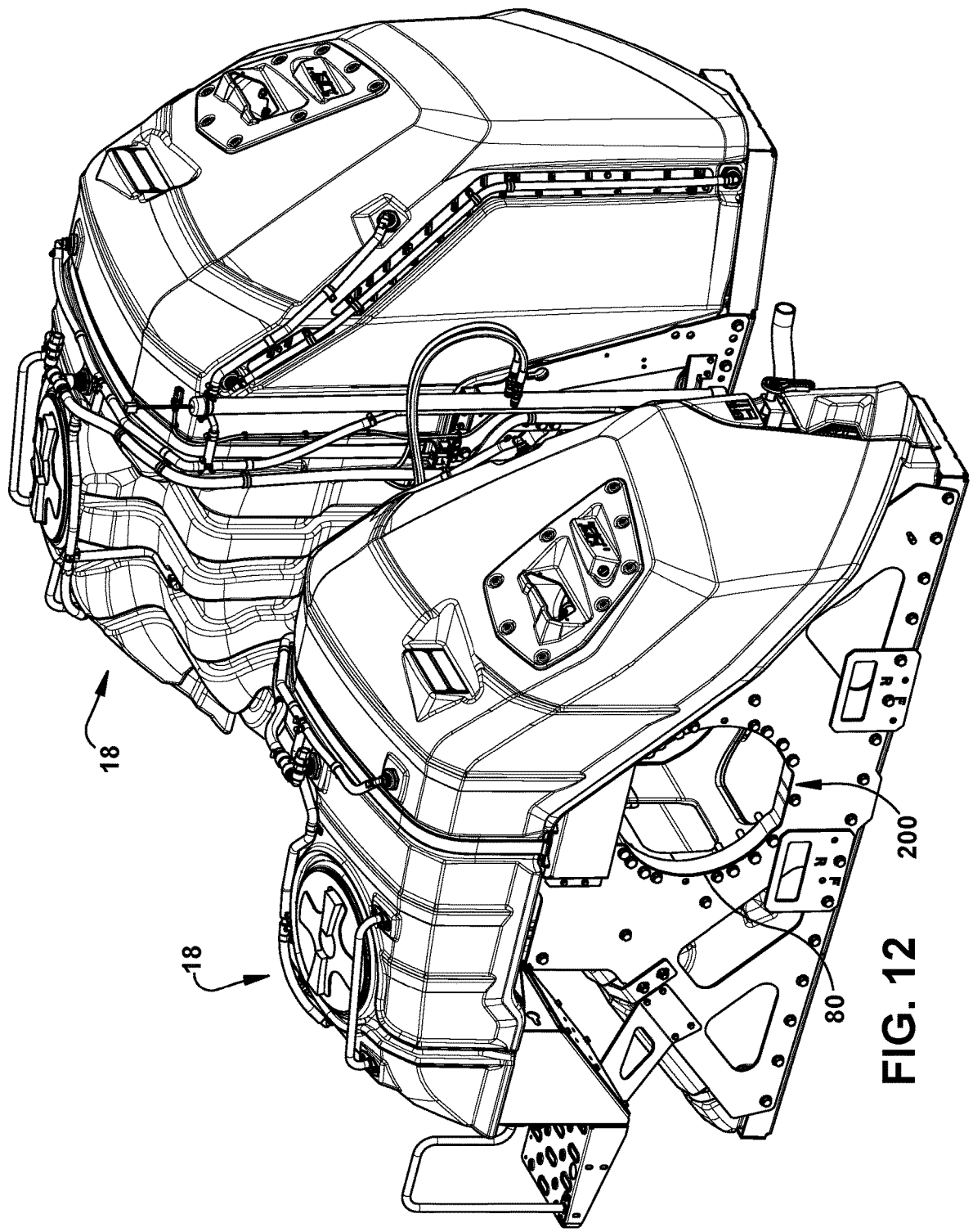

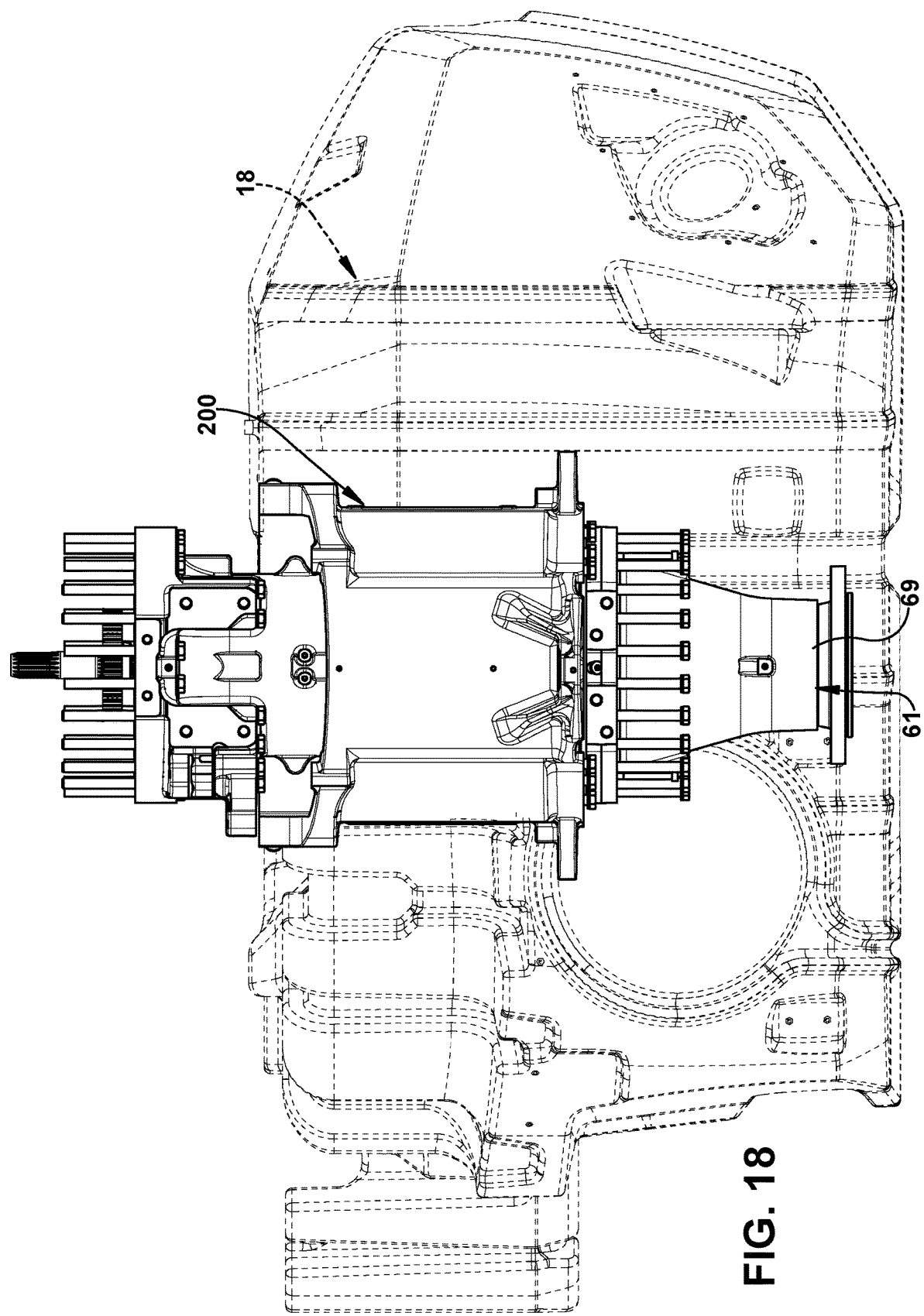

WORK VEHICLE WITH SUPPORT DEVICE FOR MOUNTING A COMMODITY TANK AND SUPPORT DEVICE MOUNTING A COMMODITY TANK TO A WORK VEHICLE

CROSS-REFERENCE TO RELATED APPLICATION

The present application is related to U.S. patent application Ser. No. 16/158,864, filed Oct. 12, 2018, the content of which is hereby incorporated by reference in its entirety.

TECHNICAL FIELD

The example embodiments relate to commodity tanks in work vehicles such as tractors or the like and, in particular, to work vehicles with support devices for mounting commodity tanks to the work vehicles, to support devices mounting commodity tanks to work vehicles, and to manufacturing methods for mounting commodity tanks to the work vehicles.

BACKGROUND OF THE DISCLOSURE

A work vehicle, such as a tractor to name a non-limiting example, may travel in a work area, such as a field of crops to name a non-limiting example, while applying a material to the work area, such as the spraying, injecting, or otherwise dispensing of a fertilizer, nutrient, herbicide, pesticide, and/or other material to soil, a plant, and/or row(s) of crops to name non-limiting examples. The work vehicle may carry, tow, or otherwise be connected to a commodity tank to store the material and may be capable of spraying, injecting, dispensing, or otherwise utilizing the material or applying the material at the work area. Conventional commodity tanks may be cylindrical containers that are generally mounted to the work vehicle at raised, outboard locations to avoid interference with wheels or other ground-engaging structures of the work vehicle or the work tools or implements of the work vehicle. However, the mounting location of conventional commodity tanks may undesirably raise the center of gravity of the work vehicle and may also adversely affect the maneuverability and accessibility of the work vehicle due to decreased stability and increased overall width and/or length of the work vehicle. Further, such conventional commodity tanks often obstruct the visibility of the operator and reduce the operator's ease of access to and from the operator station.

Still further, the methods and mechanisms used for mounting the commodity tank to the associated work vehicle such as by using a set of struts provided on the tank and multiple brackets or the like on the work vehicle, are often complicated and difficult to implement during assembly of the vehicle.

Therefore, there is a need in the art for methods and mechanisms for mounting a commodity tank to an area of an associated work vehicle that doesn't undesirably raise the center of gravity, adversely affect the maneuverability and accessibility of the work vehicle, or obstruct the operator's view of areas around the vehicle, and that is not complicated and that is easy to implement during assembly of the vehicle.

SUMMARY OF THE DISCLOSURE

In an embodiment of the present disclosure, a support device for mounting a commodity tank to a work vehicle is provided.

In an embodiment of the present disclosure, a commodity tank support device is provided for mounting an associated commodity tank of an associated work vehicle on an end portion of a drive axle assembly of the associated work vehicle having an axle with a distal end selectively coupleable with a ground engaging member driven by the axle assembly.

In an embodiment of the present disclosure, the commodity tank support device includes a main body portion defining an elongate opening configured to receive the end portion of the drive axle assembly of the associated work vehicle extending through the opening, and first and second mounting portions, wherein the a first mounting portion is configured for selective fastening with a corresponding associated axle mounting structure on the end portion of the drive axle assembly of the associated work vehicle, and wherein a second mounting portion is configured for selective fastening with a corresponding associated commodity tank mounting structure of the commodity tank of the associated work vehicle.

In an embodiment of the present disclosure, a work vehicle is provided having a ground engaging member, a drive axle assembly including an axle having a distal end selectively coupleable with the ground engaging member for driving the ground engaging member by the axle assembly, a commodity tank including a commodity tank mounting structure, and a commodity tank support device mounting the commodity tank on an end portion of the drive axle assembly of the work vehicle. In the example embodiment, the commodity tank surrounds the axle assembly of the work vehicle. In the example embodiment, the commodity tank support device surrounds the axle assembly of the work vehicle. In the example embodiment, both the commodity tank support device mounting the commodity tank on the end portion of the drive axle assembly and the commodity tank supported by the commodity tank support device surround the axle assembly of the work vehicle.

Other features and aspects will become apparent by consideration of the detailed description and accompanying drawings.

BRIEF DESCRIPTION OF THE DRAWINGS

The detailed description of the drawings refers to the accompanying figures in which:

FIG. 12 is an elevated perspective view of the commodity tank support device of FIGS. 8-10 received in an opening provided in the commodity tank in accordance with an example embodiment;

FIG. 18 is a top plan view corresponding with FIG. 5 of a commodity tank supported on a work vehicle by a support device in accordance with an embodiment of the present disclosure.

DETAILED DESCRIPTION OF THE DRAWINGS

Figure 1:
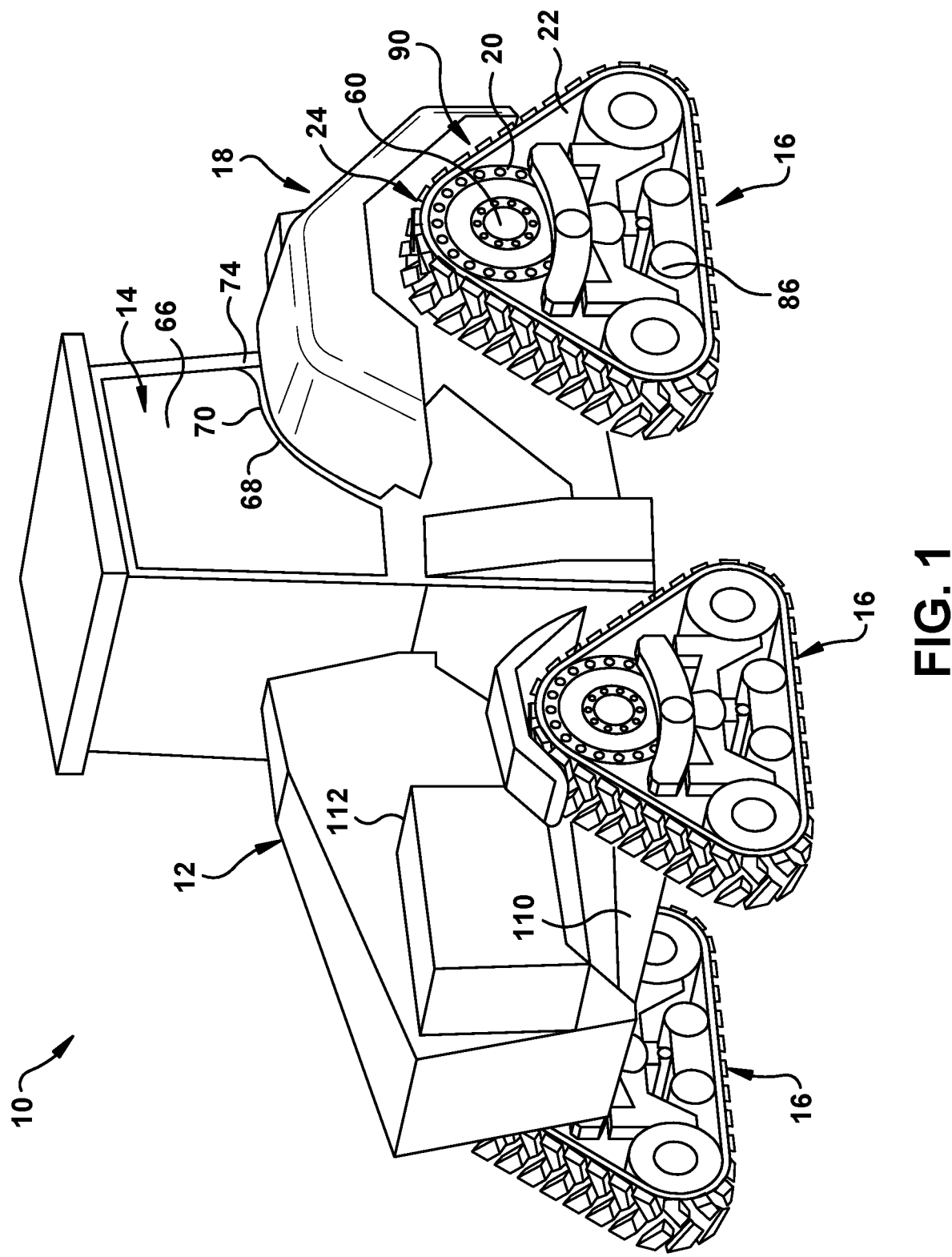
FIG. 1 is a perspective view of a commodity tank supported on a work vehicle by a support device in accordance with an embodiment of the present disclosure.

Referring to FIG. 1, a work vehicle 10 is illustrated with a commodity tank mounted on the work vehicle using a commodity tank support device in accordance with an embodiment of the present disclosure. The work vehicle 10 includes a work vehicle body 12 having a work vehicle frame 110 and an engine or other power source 112. The work vehicle 10 further includes an operator station 14, and a plurality of track assemblies 16. Although the vehicle 10 is illustrated with four track assemblies 16, the vehicle 10 of additional embodiments of the present disclosure may include any number of track assemblies or other ground-engaging members or structures, such as wheels to name a non-limiting example, to enable movement of the vehicle 10 across a ground surface. In a further non-limiting example, the work vehicle 10 may include wheels at the front of the work vehicle 10 and the track assemblies 16 at the rear of the vehicle 10. The vehicle 10 includes at least one drive axle 60 driven through a drive axle assembly to be described in greater detail below by the power source 112 and driving or otherwise configured to drive the track assembly or assemblies 16 or other ground-engaging structures at the rear of the vehicle 10. A distal end of the drive axle 60 is visible in the view of the work vehicle 10 illustrated in the Figures showing that it is readily accessible during manufacture, wherein the track assembly 16 or other ground-engaging structures 16 may be coupled onto the distal end of the drive axle 60 as a near final step during assembly of the work vehicle 10.

The work vehicle 10 of the illustrated embodiment further includes one or more commodity tank(s) 18 mounted or otherwise coupled to the work vehicle 10 by a corresponding one or more commodity support devices of the illustrated embodiment to be described in greater detail below. The one or more commodity tank(s) 18 are configured to store material, such as for application outside of the work vehicle 10 in a non-limiting example. The work vehicle 10 may further utilize the commodity tank(s) 18 for storing water or other material for ballast, stability, or weight control. Each commodity tank 18 is configured to store fertilizer, herbicide, pesticide, water, fuel, or another nutrient, chemical, or other material for storage, utilization by the work vehicle 10, and/or dispensing at or onto a work area, such as a crop field to name a non-limiting example. The illustrated embodiment includes two commodity tanks 18 and two support devices as mirror images of each other relative to a vertical plane extending through a central, longitudinal axis of the work vehicle 10. However, the two commodity tanks 18 and support devices of another embodiment are not mirror images of each other. Further, additional embodiments of the present disclosure may include either a single commodity tank 18 and support device disposed on a side of the vehicle 10 or a commodity tank 18 and support device on both sides of the vehicle 10 and extending between the two sides of the work vehicle 10, such as behind or otherwise around the operator station 14.

As will be appreciated, tank support devices formed in accordance with an example embodiment may be used to connect the pair of commodity tanks 18 illustrated with portions of the drive axle assembly of the work vehicle on sides of the distal ends of the axle 60 opposite from the ground engaging structures 16. In that way, the left and right commodity tanks 18 illustrated may be installed onto the axle assemblies and inboard of the distal ends of the axles during manufacture before the track assemblies 16 are installed onto the work vehicle, thereby saving time and costs by simplifying the manufacturing process.

Figure 2:
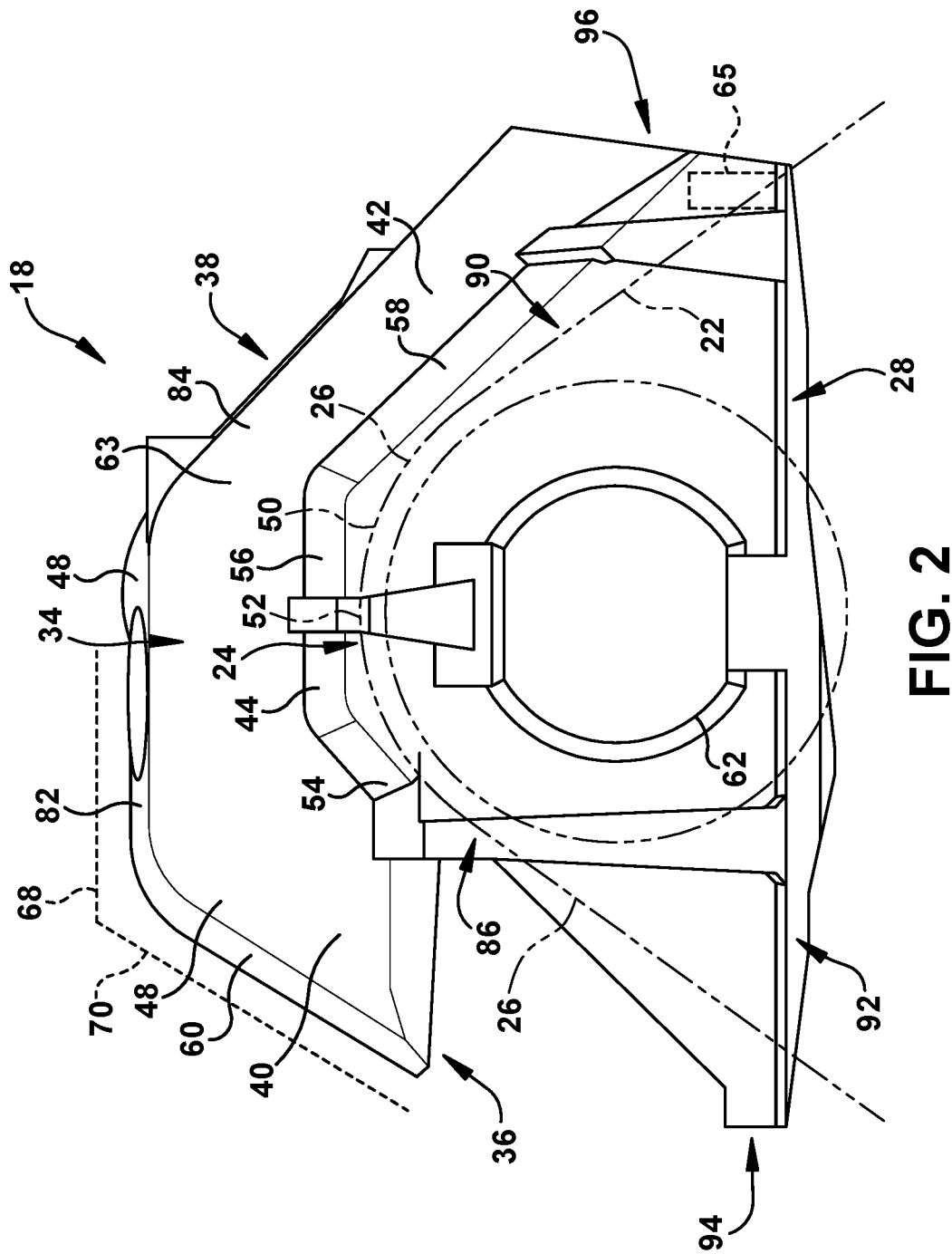
FIG. 2 is a left side elevation view of a commodity tank supported on a work vehicle by a support device in accordance with an embodiment of the present disclosure.

With reference to FIG. 2 and continued reference to FIG. 1, the track assembly 16 of an embodiment of the present disclosure supports the vehicle 10, including the work vehicle body 12, the operator station 14, and/or the commodity tank(s) 18. The track assembly 16 of the illustrated embodiment is generally triangular, as defined by an endless track 22, with a main track wheel 20 disposed at an upper portion 24 of the track assembly 16. As shown in FIG. 2, the track assembly 16 includes a track assembly upper profile 26 as defined at least partially by the endless track 22 positioned at the upper portion 24 of the track assembly 16. However, the track assembly 16 of additional embodiments of the present disclosure may be configured as a different shape, include different components, and/or include a different upper profile than that illustrated in FIGS. 1 and 2. As shown in FIGS. 1 and 2, the track assembly upper profile 26 of one embodiment includes a curve 50 having a central peak 52.

Although FIGS. 2-7 and 16-18 illustrate only one commodity tank 18 connected by a commodity tank support device (FIGS. 9 and 10) in accordance with an example embodiment on the left side of the vehicle 10, the embodiments and descriptions provided in the present disclosure further apply to any other commodity tank of the present disclosure, including the commodity tank 18 connected by a commodity tank support device (FIGS. 9 and 10) in accordance with an example embodiment on the right side of the vehicle 10. As the commodity tank 18 on the right side of the vehicle 10 is a mirror image of the commodity tank 18 shown in FIGS. 2-7 and 16-18, and as the commodity tank support devices (FIGS. 9 and 10) in accordance with an example embodiment for mounting the left and right tanks are also mirror images of each other, one of ordinary skill in the art will appreciate that any structure or feature illustrated in FIGS. 2-7 and 16-18 may be duplicated for the commodity tank 18 and support device on the right side as a mirror image relative to a vertical plane extending through a central, longitudinal axis of the work vehicle 10, and that any structure or feature illustrated in FIGS. 9 and 10 may be duplicated for the support device on the right side as a mirror image relative to a vertical plane extending through a central, longitudinal axis of the work vehicle 10.

Figure 3:
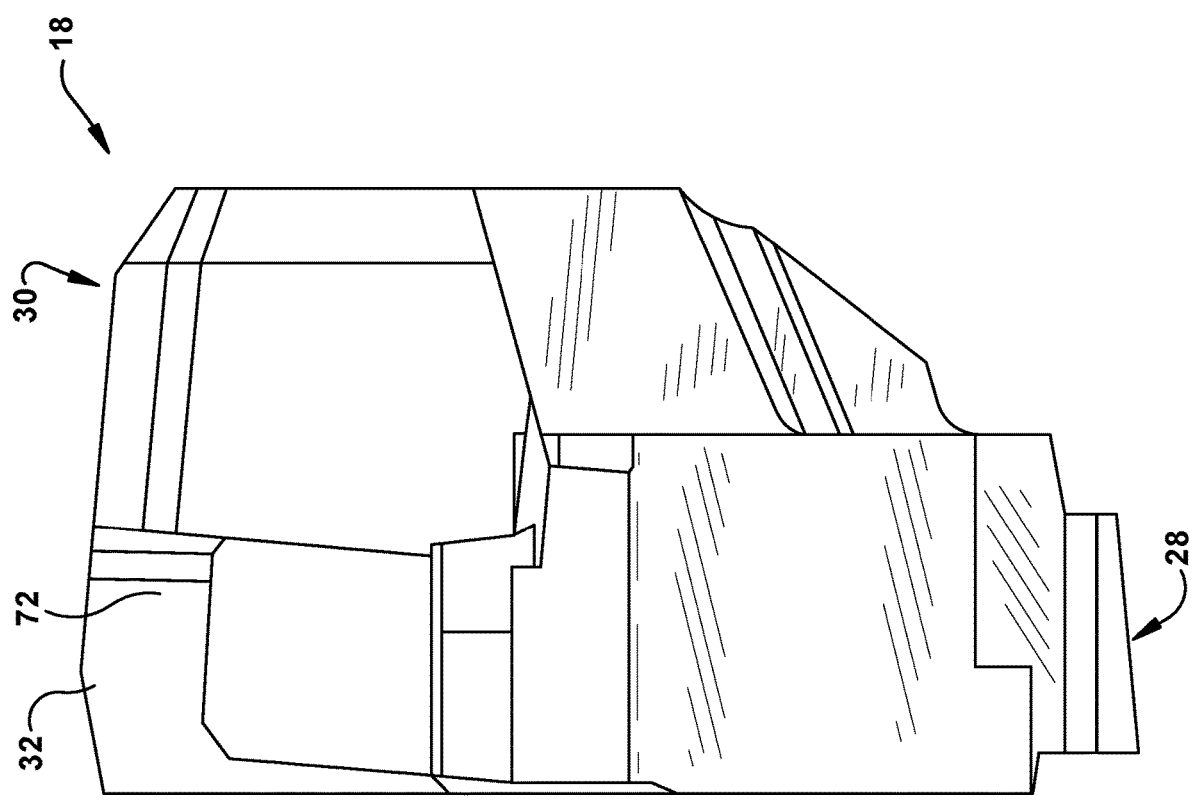
FIG. 3 is a front side elevation view of a commodity tank to be supported on a work vehicle by a support device in accordance with an embodiment of the present disclosure.

Referring now to FIG. 3 with continuing reference to FIG. 2, the commodity tank 18 includes an inboard portion 28 extending vertically downward from an upper end 32 of the inboard portion 28. The inboard portion 28 is positioned or otherwise configured for positioning at an inboard location of the tracked work vehicle 10, as illustrated in FIG. 1. The commodity tank 18 further includes an outboard portion 30 extending horizontally from the upper end 32 of the inboard portion 28. The outboard portion 30 extends or is otherwise configured to extend at least partially over the track assembly 16 of the tracked work vehicle 10.

Figure 4:
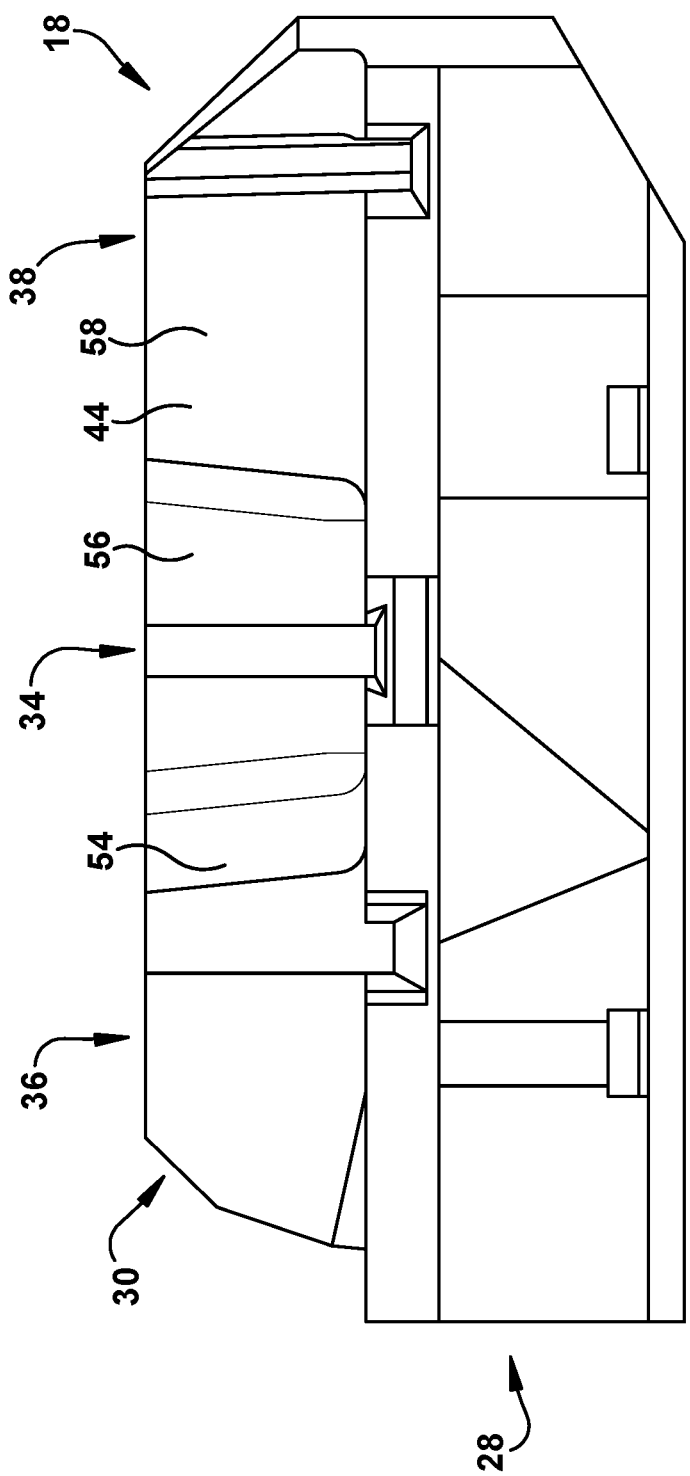
FIG. 4 is a bottom plan view of a commodity tank to be supported on a work vehicle by a support device in accordance with an embodiment of the present disclosure.
Figure 5:
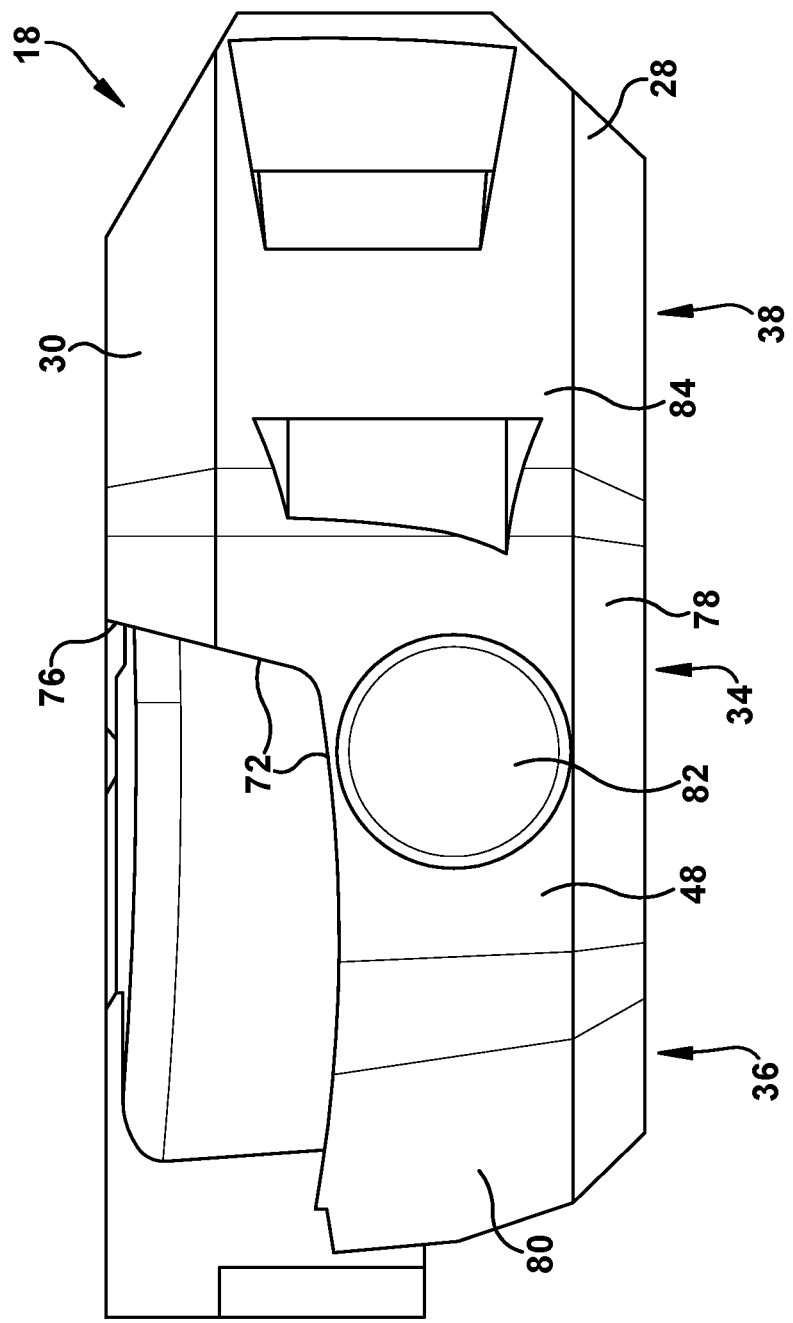
FIG. 5 is a top plan view of a commodity tank to be supported on a work vehicle by a support device in accordance with an embodiment of the present disclosure.

FIG. 4 is a bottom plan view of the commodity tank 18, and FIG. 5 is a top plan view of the commodity tank 18. FIGS. 2, 4, and 5 illustrate the commodity tank 18 having a central portion 34, a front portion 36, and a rear portion 38. As best shown in FIGS. 1 and 2, the central portion 34 is mounted at least partially over or configured to be mounted at least partially over the central peak 52 of the track assembly 16 of the tracked vehicle 10. Further, the front portion 36 extends at least partially forward from the central portion 34. The front portion 36 includes at least one front portion surface 40 extending downward from the central portion 34. In the illustrated embodiment, the front portion surface 40 is oriented diagonally downward from the central portion 34. The rear portion 38 extends at least partially rearward from the central portion 34. The rear portion 38 includes at least one rear portion surface 42 extending downward from the central portion 34. In the illustrated embodiment, the rear portion surface 42 is oriented diagonally downward from the central portion 34.

Figure 6:
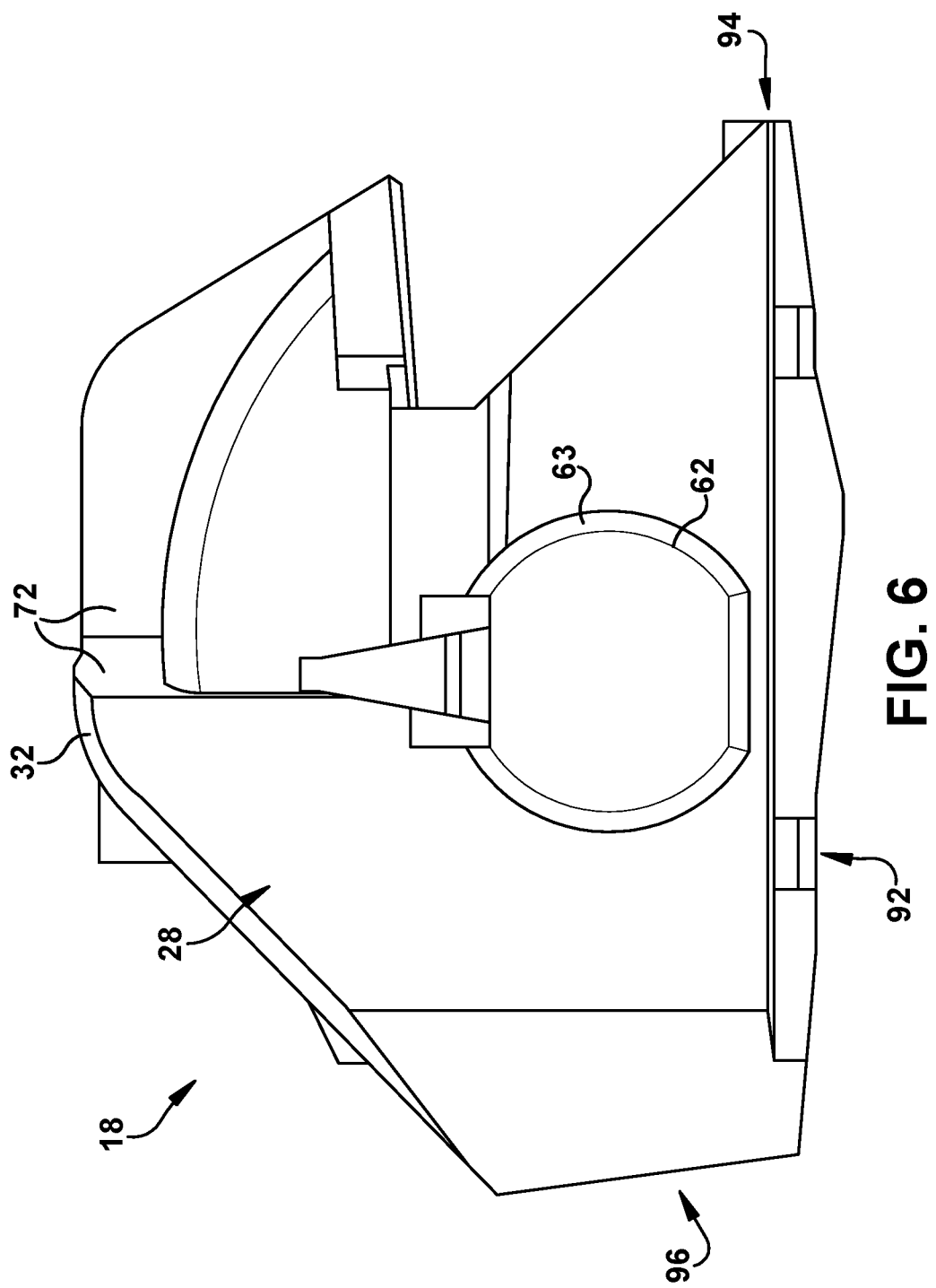
FIG. 6 is a right side elevation view of a commodity tank to be supported on a work vehicle by a support device in accordance with an embodiment of the present disclosure.

FIG. 6 illustrates an elevation view of the commodity tank 18 from an inboard end. As described herein, the inboard end refers to an inboard side or portion disposed at a generally inboard location relative to the outer surfaces of the commodity tank 18 or vehicle 10. Similarly, another "end" identified herein may refer to a side or other portion being disposed at a relative location. As shown in FIG. 6 with reference to FIGS. 1 and 2, the commodity tank 18 includes an opening 62 disposed in the inboard portion 28. The opening 62 accommodates or is otherwise configured to accommodate the drive axle 60 of the tracked work vehicle 10 extending through the inboard portion 28. The commodity tank commodity tank 18 further includes a mounting structure 63 surrounding the opening 62 for mounting the tank onto a commodity tank support device 200 (FIGS. 9 and 10) in accordance with an example embodiment. In the illustrated embodiment, the commodity tank 18 is shaped or otherwise configured to surround or otherwise occupy space around the drive axle 60 such that material stored in the commodity tank 18 may surround or otherwise occupy space around the drive axle 60. In the embodiment illustrated, the drive axle 60, including either a single axle assembly or multiple axle assemblies independently formed, controlled, and/or driven, extends through the opening 62 of the inboard portion 28 of each of two commodity tanks 18 positioned on each side of the vehicle 10.

In addition and in accordance with the example embodiments, the opening 62 in the commodity tanks 18 accommodate or are otherwise configured to accommodate the commodity tank support device 200 such as shown for example in FIGS. 12 and 16-18, so that the commodity tank support device 200 may support the commodity tanks surrounding the drive axle 60 of the tracked work vehicle 10, wherein both the commodity tank support device 200 as well as a drive axle assembly containing the drive axle 60 of the tracked work vehicle 10 extend through the inboard portion 28. In the illustrated embodiment, the commodity tank 18 is shaped or otherwise configured to surround or otherwise occupy space around the drive axle 60 and also around the commodity tank support device 200 carried on the drive axle assembly such that material stored in the commodity tank 18 may surround or otherwise occupy space around the drive axle 60 and also around the commodity tank support device 200. In the embodiment illustrated, the drive axle 60, including either a single axle assembly or multiple axle assemblies independently formed, controlled, and/or driven, extends through the opening 62 of the inboard portion 28 of each of two commodity tanks 18 positioned on each side of the vehicle 10. The drive axle 60, including either a single axle assembly or multiple axle assemblies independently formed, controlled, and/or driven, may extend completely through the openings 62 of each of two commodity tanks 18 positioned on each side of the vehicle 10 and also completely through the tank support devices 200 disposed in the openings 62 for carrying the commodity tanks 18 relative to the axle assemblies of the vehicle 10. The commodity tank support device 200 also extends through the opening 62 of the inboard portion 28 of each of two commodity tanks 18 positioned on each side of the vehicle 10.

The commodity tank support device 200 is disposed between the commodity tanks and the axle assembly that houses the drive axle of the vehicle, and couples the commodity tanks with the axle assembly inboard of the ground engaging members for supporting the commodity tanks on the work vehicle. The commodity tank support device 200 therefore provides a mechanism for mounting a commodity tank to an area of an associated work vehicle that doesn't undesirably raise the center of gravity or adversely affect the maneuverability and accessibility of the work vehicle, and that is not complicated and is easy to implement during assembly of the vehicle.

As best shown in FIGS. 2 and 6, the commodity tank 18 of the illustrated embodiment further includes a lower end 92 extending from a forwardmost end 94 of the commodity tank 18 to a rearwardmost end 96 of the commodity tank 18. The lower end 92 of the commodity tank 18 of the illustrated embodiment has a length equal to or greater than a length of the outboard portion 30 from the forwardmost end 94 of the commodity tank 18 to the rearwardmost end 96 of the commodity tank 18. In the illustrated embodiment, the lower end 92 of the commodity tank 18 has a length greater than the length of the outboard potion 30 from the forwardmost end 94 of the commodity tank 18 to the rearwardmost end 96 of the commodity tank.

Figure 7:
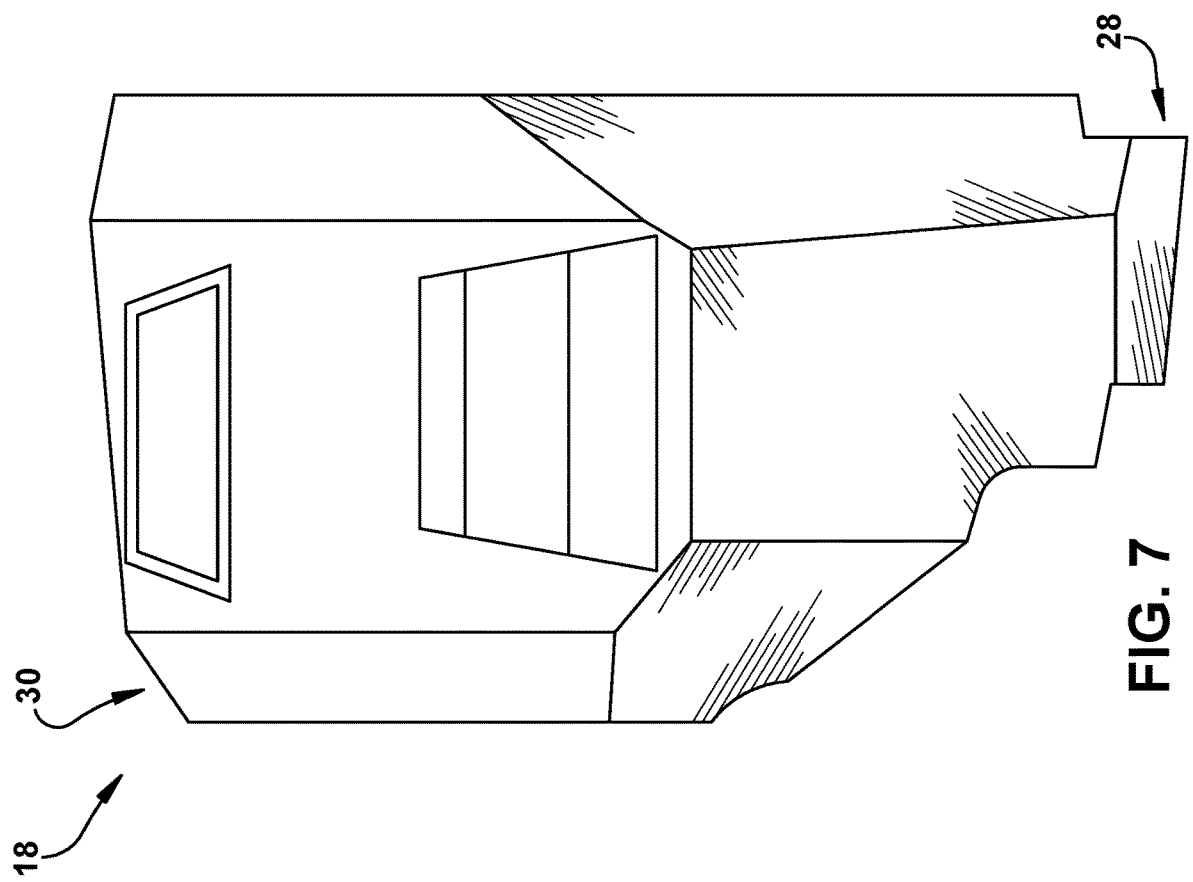
FIG. 7 is a rear side elevation view of a commodity tank to be supported on a work vehicle by a support device in accordance with an embodiment of the present disclosure.

FIG. 7 illustrates a rear elevation view of the commodity tank 18. Although not illustrated, the commodity tank 18 of one or more embodiments of the present disclosure includes one or more lighting, signaling, wiring, marking, or other items or components coupled to the commodity tank 18, such as on a rearward-facing surface of the commodity tank 18. Further, one or more step(s), handrail(s), post(s), and/or other structural features may be included on or with the commodity tank 18 in other embodiments. Further, such lighting, wiring, signaling, marking, structural features, or other items or components may be integrated into the commodity tank 18 or integrally formed with the commodity tank 18.

Referring again to FIGS. 1 and 2, the commodity tank 18 of an embodiment includes a lower surface 44 at least partially facing the endless track 22 or is otherwise configured to at least partially face the endless track 22 of the track assembly 16 of the tracked work vehicle 10. The commodity tank 18 further includes an upper surface 48 mounted adjacent to or otherwise configured for mounting adjacent to the operator station 14. The lower surface 44 is spaced from the endless track 22 along the track assembly upper profile 26 and/or is shaped in correspondence to the track assembly upper profile 26. As best shown in FIG. 2, the lower surface 44, the upper surface 48, and/or any other part of the outboard portion 30 extends along an outboard portion profile 48 corresponding to, following the contour of, and/or complimenting the track assembly upper profile 26. In an embodiment, the outboard portion 30 at least partially wraps around the upper portion 24 of the track assembly 16. In additional embodiments not illustrated, the outboard portion 30 extends at least partially over at least part of the track assembly 16 without wrapping around any portion of the track assembly 16.

The lower surface 44 illustrated in FIGS. 2 and 4 includes a lower surface front portion 54, a lower surface central portion 56, and a lower surface rear portion 58. The lower surface front portion 54 and/or the lower surface rear portion 58 is/are disposed below the lower surface central portion 56. In the illustrated embodiment, both the lower surface front portion 54 and the lower surface rear portion 58 are disposed below the lower surface central portion 56. In an additional embodiment not illustrated, neither the lower surface front portion 54 nor the lower surface rear portion 58 is disposed below the lower surface central portion 56. The lower surface front portion 54 is spaced from or otherwise configured to be spaced from the endless track 22 along a track assembly front portion 86. The lower surface central portion 56 is spaced from or otherwise configured to be spaced from the endless track 22 along a track assembly upper portion 24. The lower surface rear portion 58 is spaced from or otherwise configured to be spaced from the endless track 22 along a track assembly rear portion 90.

The upper surface 48 illustrated in FIGS. 2 and 5 includes an upper surface front portion 80, an upper surface central portion 82, and an upper surface rear portion 84. The upper surface front portion 80 and/or the upper surface rear portion 84 is/are disposed below the upper surface central portion 82. In the illustrated embodiment, both the upper surface front portion 80 and the upper surface rear portion 84 are disposed below the upper surface central portion 82. In an additional embodiment not illustrated, neither the upper surface front portion 80 nor the upper surface rear portion 84 is disposed below the upper surface central portion 82.

Figure 17:
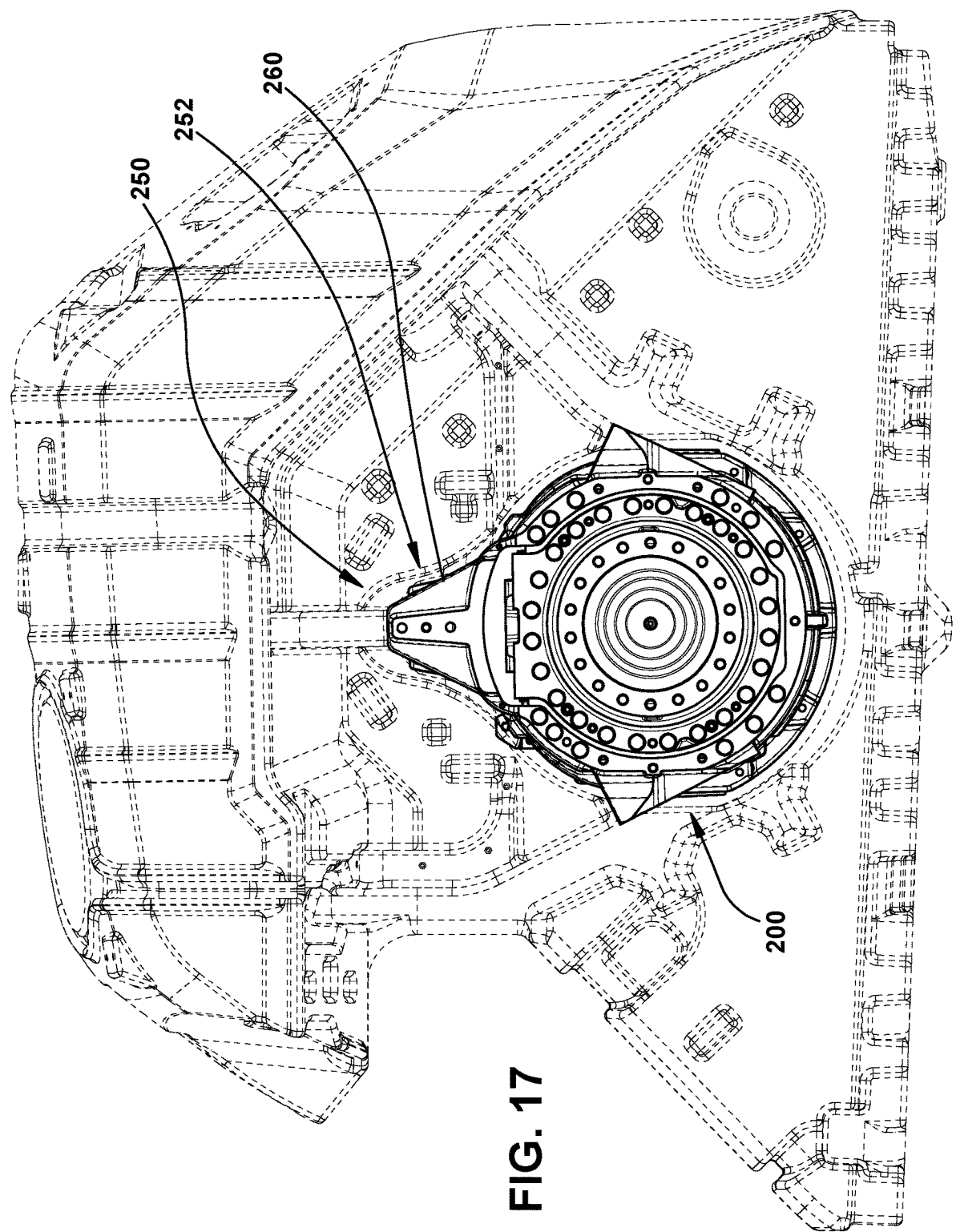
FIG. 17 is a left side elevation view corresponding with FIG. 2 of a commodity tank supported on a work vehicle by a support device in accordance with an embodiment of the present disclosure.

The operator station 14 of the work vehicle 10 includes one or more window(s) 66 or other openings through which the operator observes the operation of the work vehicle 10, any attached or cooperating work tool or vehicle, and/or the surrounding work area, as shown in FIGS. 1 and 2. Each window 66 includes a lower window edge 68 having a lower window edge profile 70. The lower window edge 68 is disposed adjacent to the upper surface 48 of the commodity tank 18 carried by the support device 200 of the example embodiments, as best illustrated in FIGS. 1, 2 and 17. In the illustrated embodiment, at least a portion of the upper surface 48 extends along, corresponds to, follows the contour of, and/or compliments the lower window edge profile 70. The upper surface 48 of the commodity tank 18 is positioned below or is configured to be positioned below the lower window edge 68 of the operator station 14 of the tracked work vehicle 10. Such an arrangement or configuration reduces the likelihood that the commodity tank 18 carried by the support device 200 of the example embodiments obstructs the visibility of the operator in the operation station 14 and improves the ability for an operator to access the operator station 14 while the work vehicle 10 utilizes the commodity tank 18 to store material.

As best shown in FIGS. 5 and 6, the inboard portion 28 of the commodity tank 18 includes an inboard surface 72 disposed at the upper end 32 of the inboard portion 28. The inboard surface 72 extends along, corresponds to, follows the contour of, compliments, and/or is shaped for positioning against an exterior surface 74 of the operator station 14 shown in FIG. 1. FIG. 5 further illustrates that the upper surface 48 is configured to extend in an outbound direction from an inbound location 76 adjacent the operator station 14 to an outbound location 78 above the track assembly 16.

As illustrated in FIG. 2, the commodity tank 18 includes one or more pump(s) 65 disposed in one or both of the commodity tank(s) 18 of the vehicle 10. The pump 65 transfers or is otherwise configured to transfer material into the commodity tank 18, out of the commodity tank 18, and/or between commodity tanks 18. In one embodiment, the pump 65 transfers material between the commodity tanks 18 in order to balance the tanks 18. In a further embodiment, the pump 65 transfers material between the commodity tank 18 and a work tool, such as a planter, fertilizer sprayer, nutrient injector, and/or another implement to name non-limiting examples. One will recognize that the commodity tank 18 described herein may include any number of pumps 65 to accomplish functions of the work vehicle 10 and commodity tank 18. Although the pump 65 of the present embodiments is illustrated as being located at or near the rearwardmost end 96 of the commodity tank 18, the pump(s) 65 may be located at any other location within the commodity tank 18. Further, although the pump 65 of the present embodiments is illustrated as being located or positioned inside the commodity tank 18, other embodiments of the present disclosure include the pump(s) 65 being formed integrally with and/or being located outside of the tank 18 in addition to or in lieu of the pump(s) 65 being located inside of the tank 18.

Figure 8:
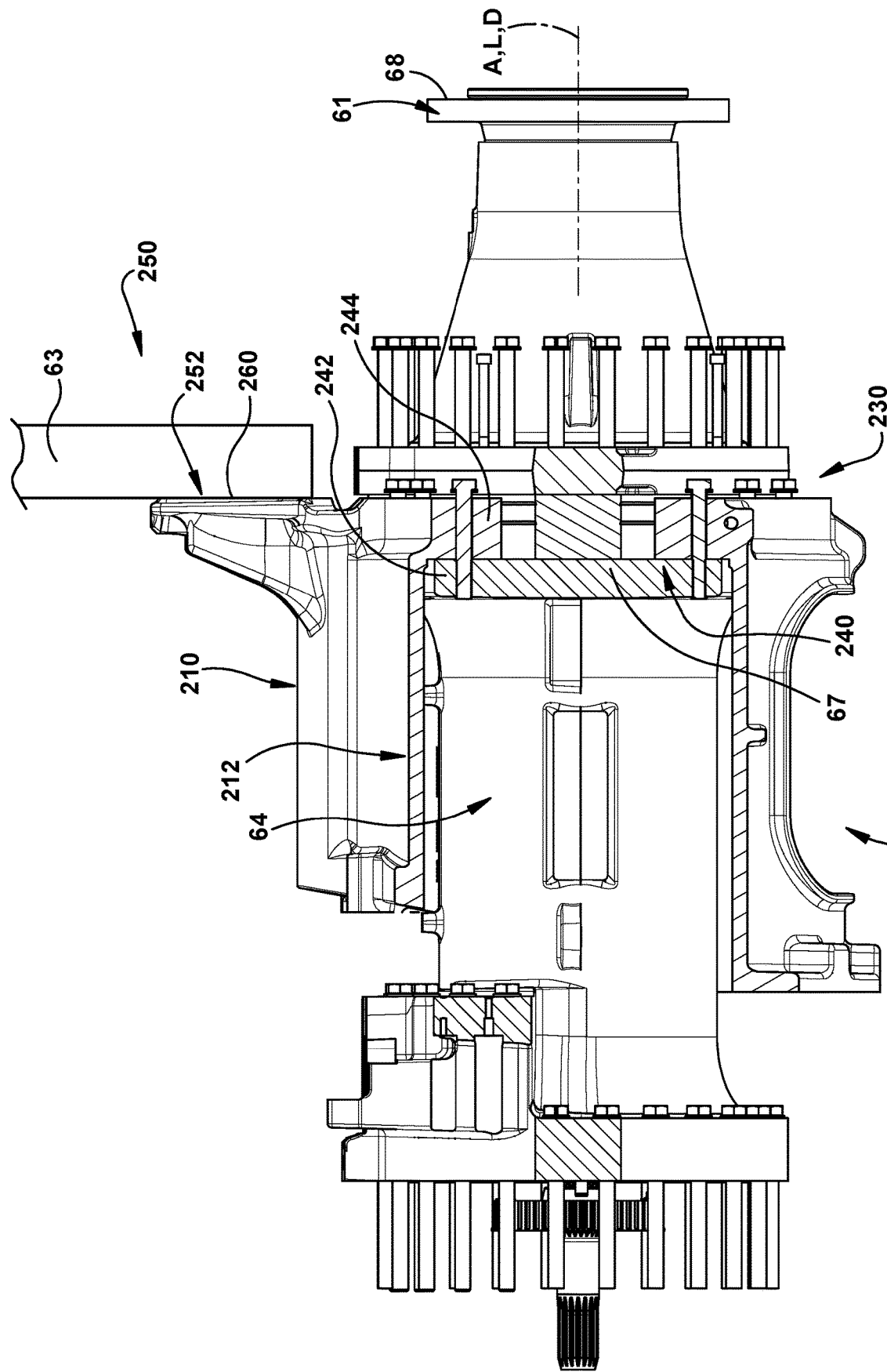
FIG. 8 is a side view in partial cross-section taken along line 8-8 in FIG. 16 of a commodity tank support device in accordance with an example embodiment mounted onto a distal end of an associated axle assembly of an associated work vehicle.
Figure 9:
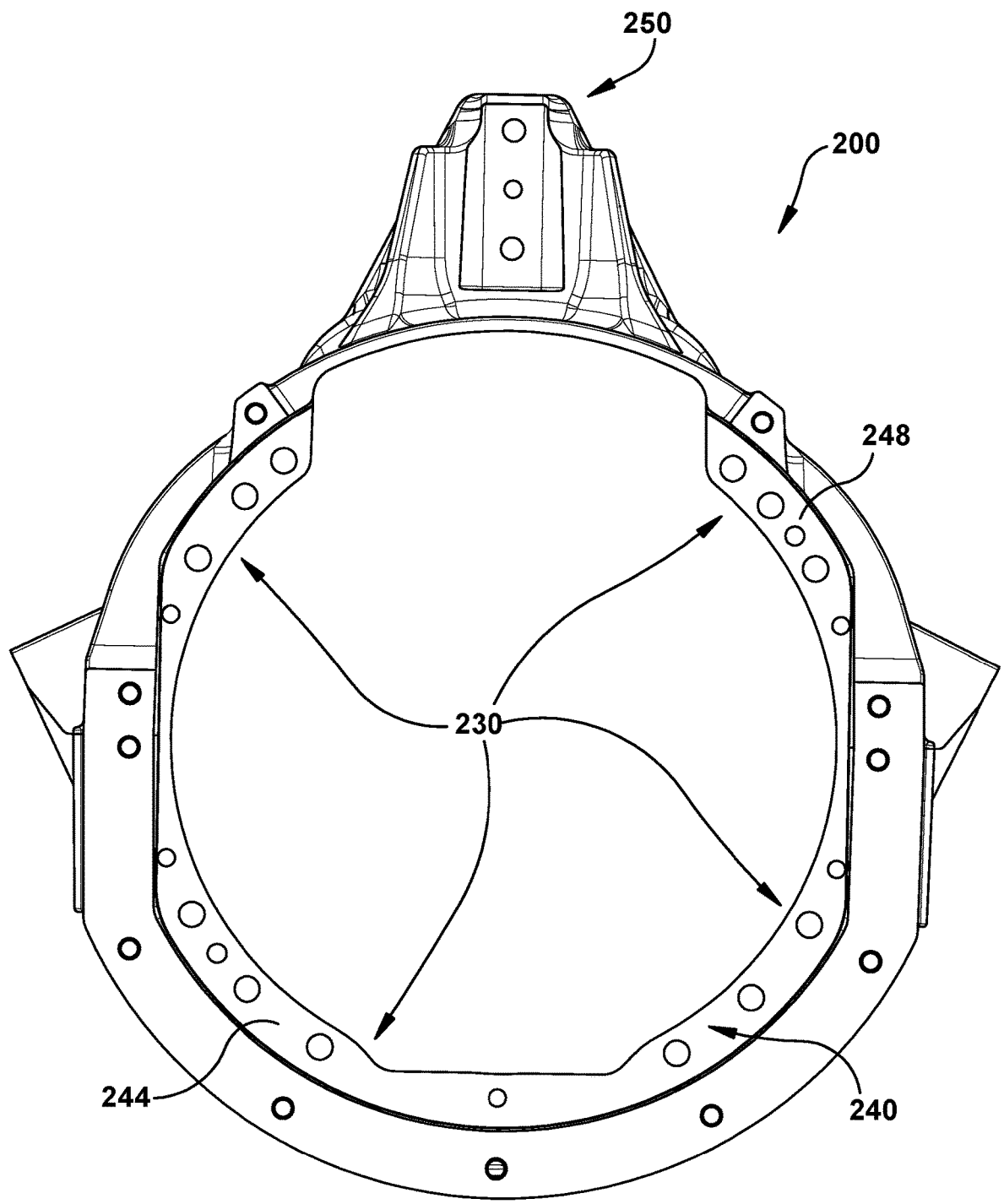
FIG. 9 is a rear elevational view of the commodity tank support device of FIG. 8 in accordance with an example embodiment.
Figure 10:
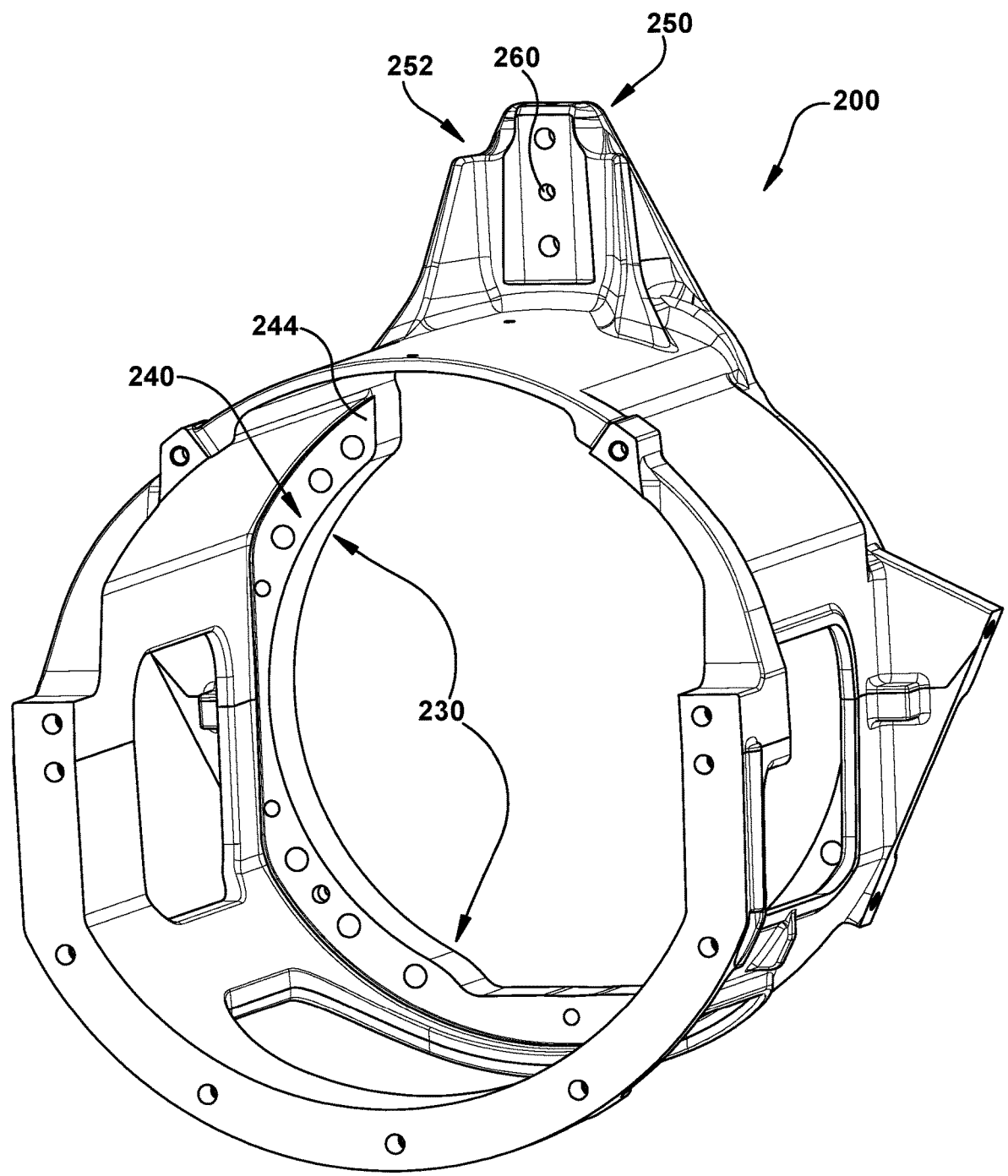
FIG. 10 is a rear elevated perspective view of the commodity tank support device of FIGS. 8 and 9 in accordance with an example embodiment.

FIGS. 8-10 shown various views of a commodity tank support device 200 in accordance with an example embodiment. In particular, FIG. 8 illustrates a side view in partial cross-section taken along line 8-8 of FIG. 15 of a commodity tank support device 200 in accordance with an example embodiment mounted onto a distal end of an associated axle assembly of an associated work vehicle, FIG. 9 illustrates a rear elevational view of the commodity tank support device in accordance with an example embodiment, and FIG. 10 illustrates a rear elevated perspective view of the commodity tank support device of FIG. 9 in accordance with an example embodiment.

With reference now to those Figures, a commodity tank support device 200 in accordance with an example embodiment is provided for mounting an associated commodity tank 18 of an associated work vehicle 10 on an end portion 64 of a drive axle assembly 66 of the associated work vehicle 10 having an axle 61 with a distal end 69 selectively coupleable with a ground engaging member 16 driven by the axle assembly 66. Overall, the commodity tank support device 200 includes a main body portion 210 and first and second mounting portions 230, 250. The main body portion 210 defines an elongate opening 212 extending along an axis A of the main body portion 210 and configured to receive the end portion 64 of the drive axle assembly 66 of the associated work vehicle 10 extending through the opening 212.

The first mounting portion 230 of the commodity tank support device 200 of the example embodiment in general defines an axle mounting portion 232 including an axle coupling member 240 configured for selective fastening with a corresponding associated axle mounting structure 67 on the end portion 64 of the drive axle assembly 66 of the associated work vehicle.

The second mounting portion 250 in general defines a commodity tank mounting portion 252 of the commodity tank support device 200, wherein the commodity tank mounting portion 252 includes a commodity tank coupling member 260 configured for selective fastening with a corresponding associated commodity tank mounting structure 63 of the commodity tank 18 of the associated work vehicle 10.

With continued reference to FIGS. 8-10, the main body portion 210 of the commodity tank support device 200 of the example embodiment includes a substantially cylindrical main body member 220 defining a main body member longitudinal axis L. In addition, the elongate opening 212 defined by the main body portion 210 extends along the main body member longitudinal axis L of the main body member 220.

In addition, the elongate opening 212 defined by the main body portion 210 is configured to receive the end portion 64 of the drive axle assembly 66 of the associated work vehicle 10 along the main body member longitudinal axis L of the main body member 220. In further addition in accordance with the example embodiment, in its installed position on the end portion of the axle assembly, the main body member 220 of the commodity tank support device 200 completely surrounds the end portion 64 of the drive axle assembly 66 of the associated work vehicle 10 when the axle coupling member 240 is selectively fastened with the corresponding associated axle mounting structure 67 on the end portion 64 of the drive axle assembly 66 of the associated work vehicle 10. FIG. 11 is an elevated perspective view of an end of the drive axle assembly 66 of the associated work vehicle adapted to receive the commodity tank support device 200 of FIG. 8 on the mounting structure 67 of the drive axle assembly 66 in accordance with an example embodiment.

With continued reference to FIGS. 8-10, the axle coupling member 240 of the commodity tank support device 200 according to the example embodiment defines a flat interface 242 in a plane substantially perpendicular to the main body member longitudinal axis L defined by the main body member 220. In the example, the flat interface 242 defined by the axle coupling member 240 comprises an annular flat interface 244 in the plane substantially perpendicular to the main body member longitudinal axis L defined by the main body member 220.

In a preferred configuration of the commodity tank support device 200 according to the example embodiment, the main body member longitudinal axis L is substantially coextensive with an axis D defined by the drive axle assembly 66 of the associated work vehicle 10 when the axle coupling member 240 is selectively fastened with the corresponding associated axle mounting structure 67 on the end portion 64 of the drive axle assembly 66 of the associated work vehicle 10. Among other benefits, this makes assembly of the commodity tank support device 200 onto the drive axle assembly 66 during manufacture of the associated work vehicle 10 fast and simple. In this regard, FIGS. 13a-13e are views showing steps in a method of mounting the commodity tank support device of FIG. 8 onto the end of an axle assembly of the work vehicle in accordance with an example embodiment and with the commodity tank removed for clarity.

With continued reference to FIGS. 8-10, the axle mounting portion 232 of the first mounting portion 230 of the commodity tank support device 200 according to the example embodiment comprises a single axle coupling member 246 defining an annular flat interface 248 in a plane substantially perpendicular to the main body member longitudinal axis L defined by the main body member 220.

Figure 11A:
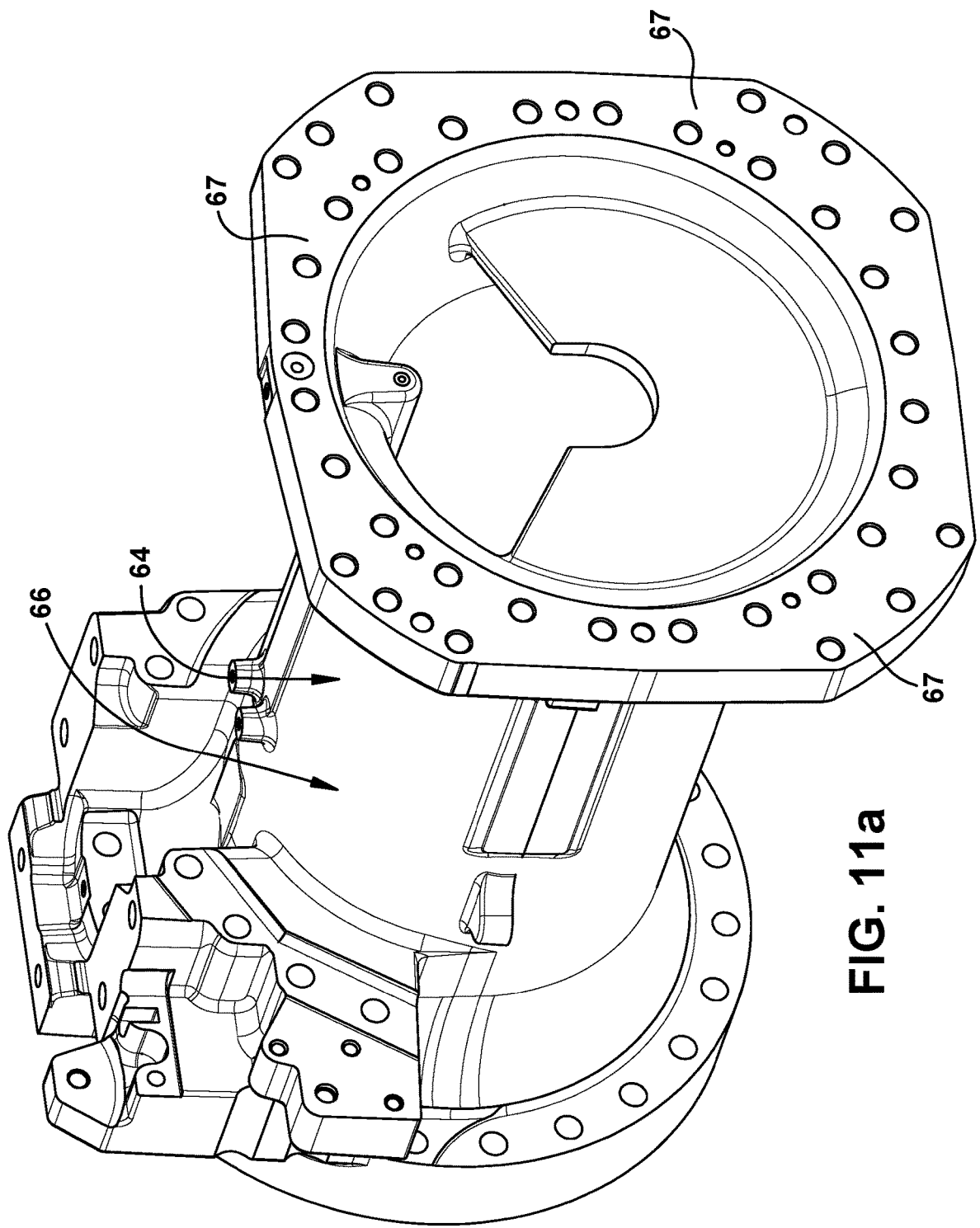
FIG. 11a is an elevated perspective view of an end of an axle assembly housing of the associated work vehicle adapted to receive the commodity tank support device of FIGS. 8-10 in accordance with an example embodiment.
Figure 11B:
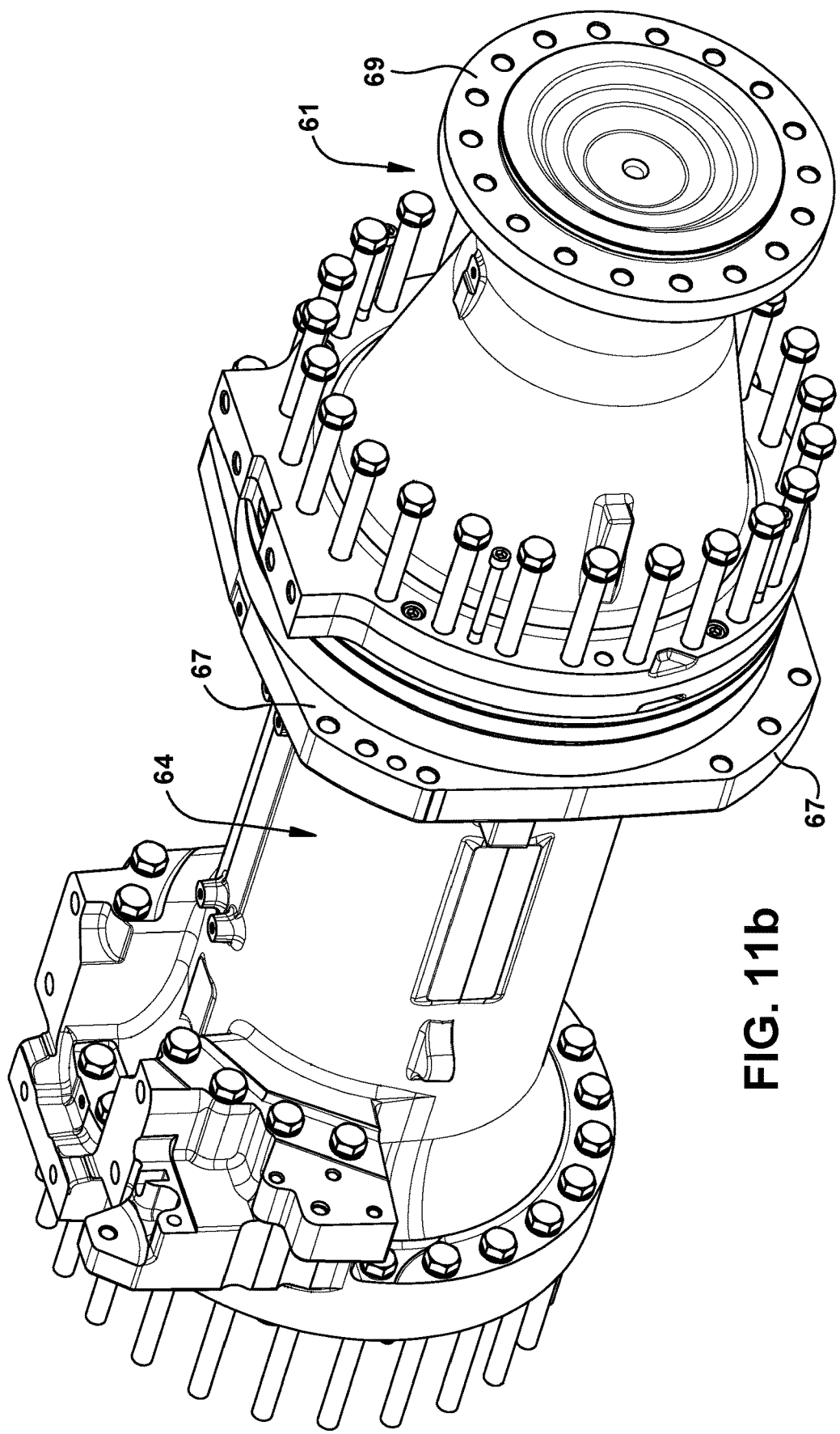
FIG. 11b is an elevated perspective view of an end of an axle assembly of the associated work vehicle adapted to receive the commodity tank support device of FIGS. 8-10 in accordance with an example embodiment and showing the distal end of the axle assembly ready to receive ground engaging members of the associated work vehicle.

FIG. 11a is an elevated perspective view of an end of an axle assembly housing 66 of the associated work vehicle adapted to receive the commodity tank support device 200 of FIGS. 8-10 in accordance with an example embodiment, and FIG. 11b is an elevated perspective view of an end of an axle assembly housing 66 of the associated work vehicle adapted to receive the commodity tank support device 200 of FIGS. 8-10 in accordance with an example embodiment and showing the distal end of the axle assembly ready to receive ground engaging members of the associated work vehicle. The Figures show the corresponding associated axle mounting structure 67 on the end portion 64 of the drive axle assembly 66 of the associated work vehicle 10. As noted above, the first mounting portion 230 (FIGS. 8-10) of the commodity tank support device 200 of the example embodiment in general defines an axle mounting portion 232 including an axle coupling member 240 configured for selective fastening with the corresponding associated axle mounting structure 67 on the end portion 64 of the drive axle assembly 66 of the associated work vehicle.

FIG. 12 is an elevated perspective view of the commodity tank support device 200 of FIGS. 8-10 received in an opening 62 provided in the commodity tank 18 in accordance with an example embodiment. As shown in FIG. 12 and with reference to FIGS. 1, 2, and 6, the commodity tank 18 includes an opening 62 disposed in the inboard portion 28. The opening 62 accommodates or is otherwise configured to accommodate the drive axle 60 of the tracked work vehicle 10 extending through the inboard portion 28. The commodity tank commodity tank 18 further includes a mounting structure 63 surrounding the opening 62 for mounting the tank onto the tank support device 200 in accordance with an example embodiment. In the illustrated embodiment, the commodity tank 18 is shaped or otherwise configured to surround or otherwise occupy space around the drive axle 60 such that material stored in the commodity tank 18 may surround or otherwise occupy space around the drive axle 60. In the embodiment illustrated, the drive axle 60, including either a single axle assembly or multiple axle assemblies independently formed, controlled, and/or driven, extends together with the tank support device 200 in accordance with an example embodiment through the opening 62 of the inboard portion 28 of each of two commodity tanks 18 positioned on each side of the vehicle 10.

In accordance with an embodiment and as shown in FIGS. 13a-13e, a method is provided for mounting a commodity tank 18 onto a work vehicle 10. A commodity tank 18 comprising a commodity tank mounting structure 63 is provided. In the example embodiment, the commodity tank support device 200 includes a main body portion 210, and first and second mounting portions 230, 250. The a main body portion 210 of the commodity tank support device 200 defines an elongate opening 212 that extends along an axis A of the main body portion 210 and that is configured to receive an end portion 64 of a drive axle assembly 66 of the work vehicle 10 extending through the opening 212. The first mounting portion 230 of the commodity tank support device 200 defines an axle mounting portion 232 of the commodity tank support device 200, wherein the axle mounting portion 232 includes an axle coupling member 240 configured for selective fastening with a corresponding axle mounting structure 67 on the end portion 64 of the drive axle assembly 66. The second mounting portion 250 of the commodity tank support device 200 defines a commodity tank mounting portion 252 of the commodity tank support device 200, wherein the commodity tank mounting portion 252 comprises a commodity tank coupling member 260 configured for selective fastening with the commodity tank mounting structure 63 of the commodity tank 18.

In the method of mounting the commodity tank 18 onto the work vehicle 10, the commodity tank support device 200 and the drive axle assembly 66 of the work vehicle 10 are moved relative to each other to receive the end portion 64 of a drive axle assembly 66 of the work vehicle 10 extending through the opening 212 of the main body portion 210. Thereafter, the axle mounting portion 232 defined by the first mounting portion 230 of the commodity tank support device 200 is fastened with the corresponding axle mounting structure 67 on the end portion 64 of the drive axle assembly 66. Also, the commodity tank coupling member 260 of the commodity tank mounting portion 252 of the commodity tank support device 200 is fastened with the commodity tank mounting structure 63 of the commodity tank 18.

In the example embodiment, moving the commodity tank support device 200 and the drive axle assembly 66 of the work vehicle 10 relative to each other includes moving the commodity tank support device 200 and the drive axle assembly 66 of the work vehicle 10 relative to each other so that the main body member 220 of the commodity tank support device 200 completely surrounds the end portion 64 of the drive axle assembly 66 when the axle coupling member 240 is selectively fastened with the corresponding associated axle mounting structure 67 on the end portion 64 of the drive axle assembly 66.

Also in the example embodiment, the providing the commodity tank support device 200 includes providing a commodity tank support device 200 having a main body portion 210 comprising a substantially cylindrical main body member 220 defining a main body member longitudinal axis L. In this embodiment, the commodity tank support device 200 and the drive axle assembly 66 of the work vehicle 10 are moved relative to each other by moving the commodity tank support device 200 and the drive axle assembly 66 of the work vehicle 10 relative to each other with the main body member longitudinal axis L of the commodity tank support device 200 being substantially coextensive with an axis D defined by the drive axle assembly 66 of the work vehicle 10.

Figure 13A:
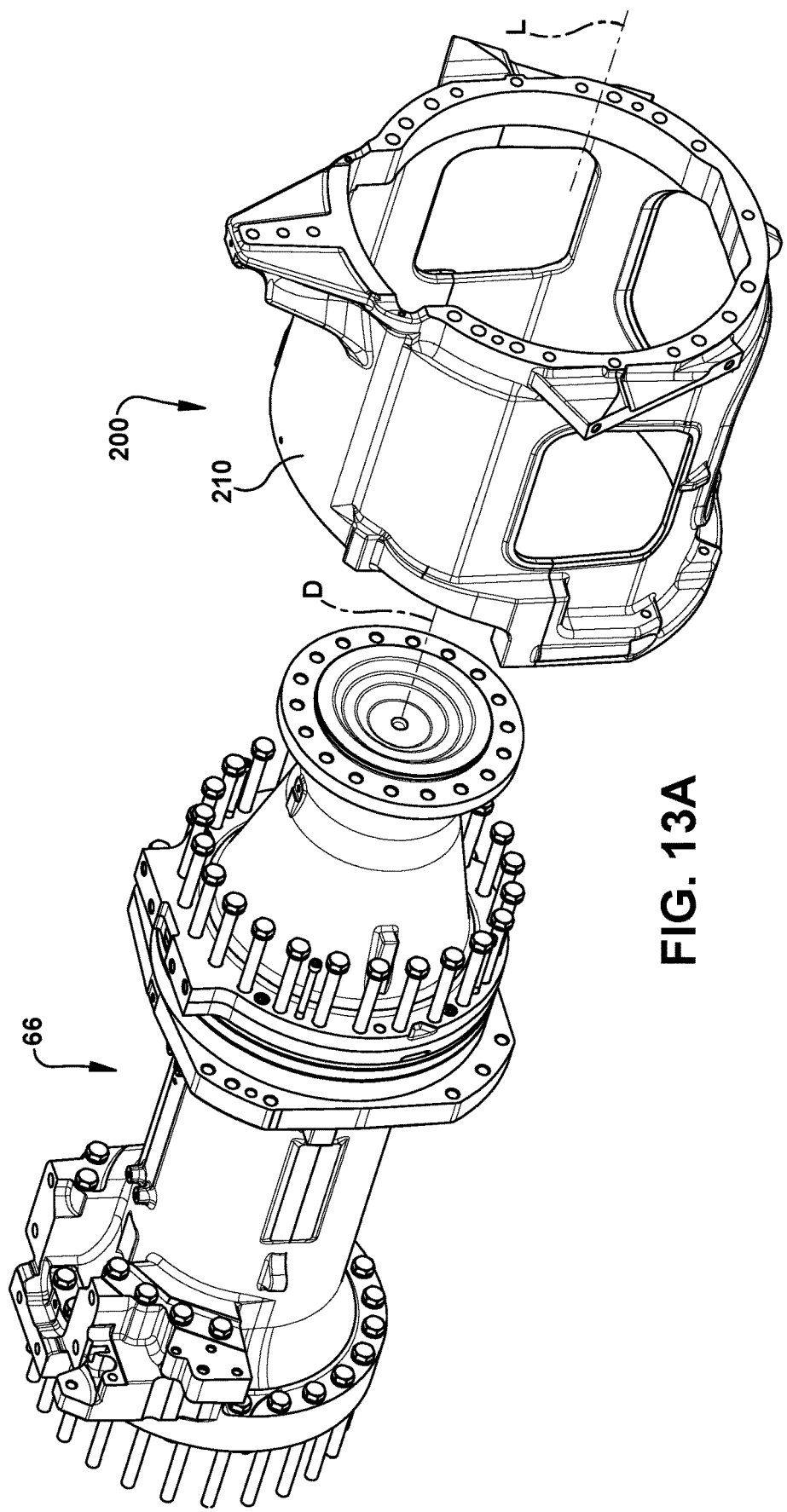
FIGS. 13a-13e are views showing steps in a method of mounting the commodity tank support device of FIGS. 8-10 onto the end of an axle assembly of the work vehicle in accordance with an example embodiment and with the commodity tank removed for clarity.
Figure 13B:
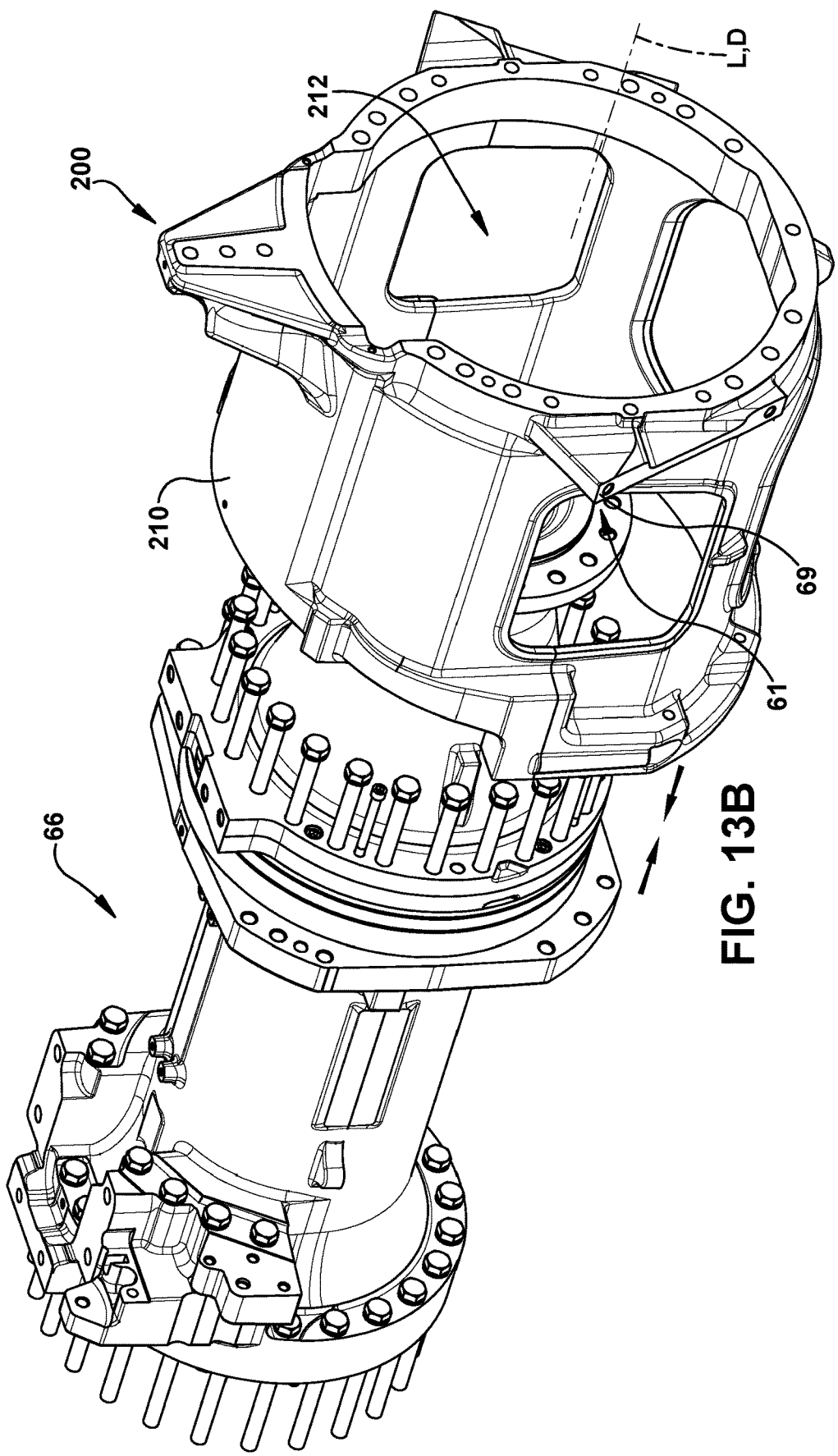
Figure 13C:
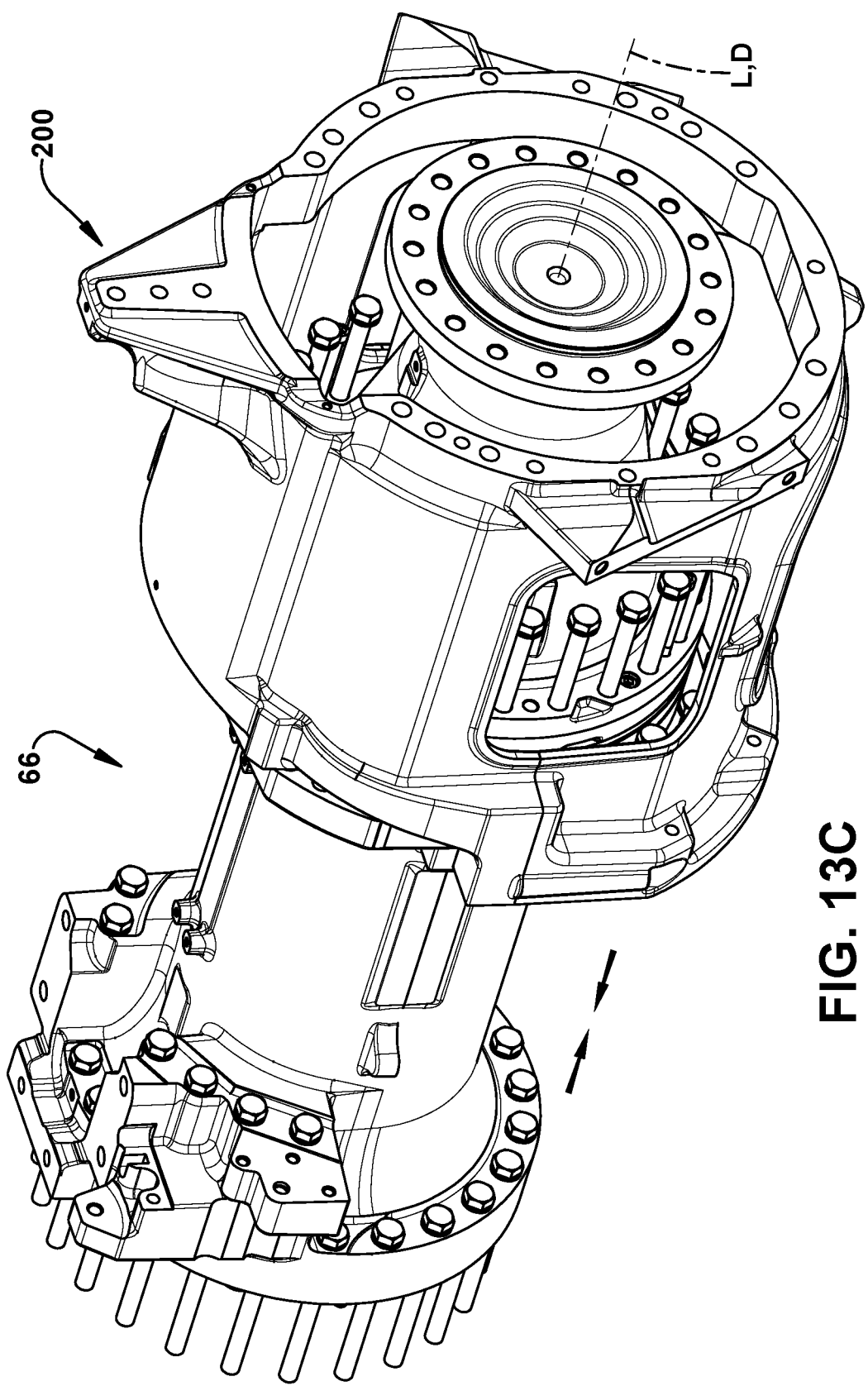
Figure 13D:
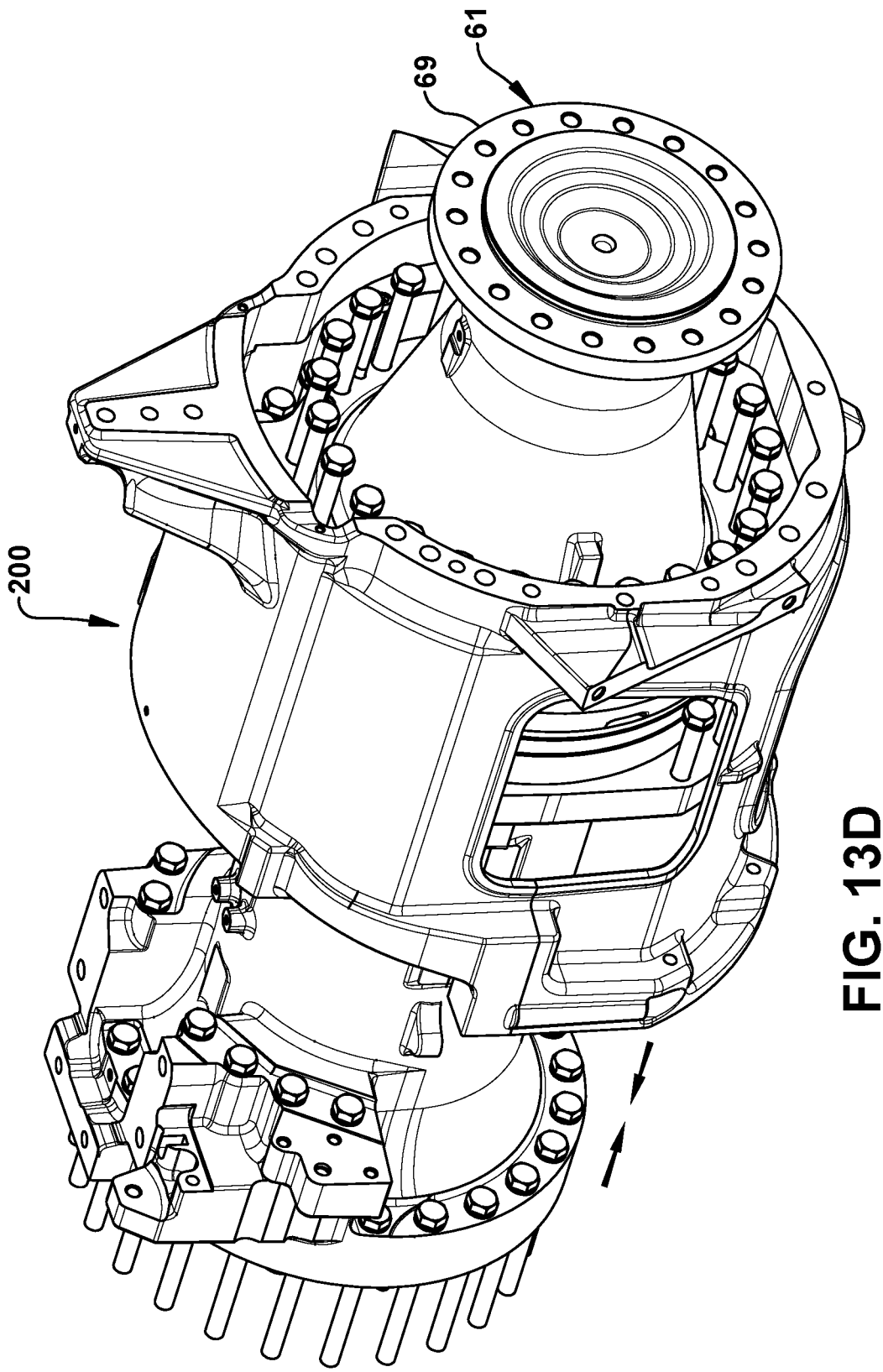
Figure 13E:
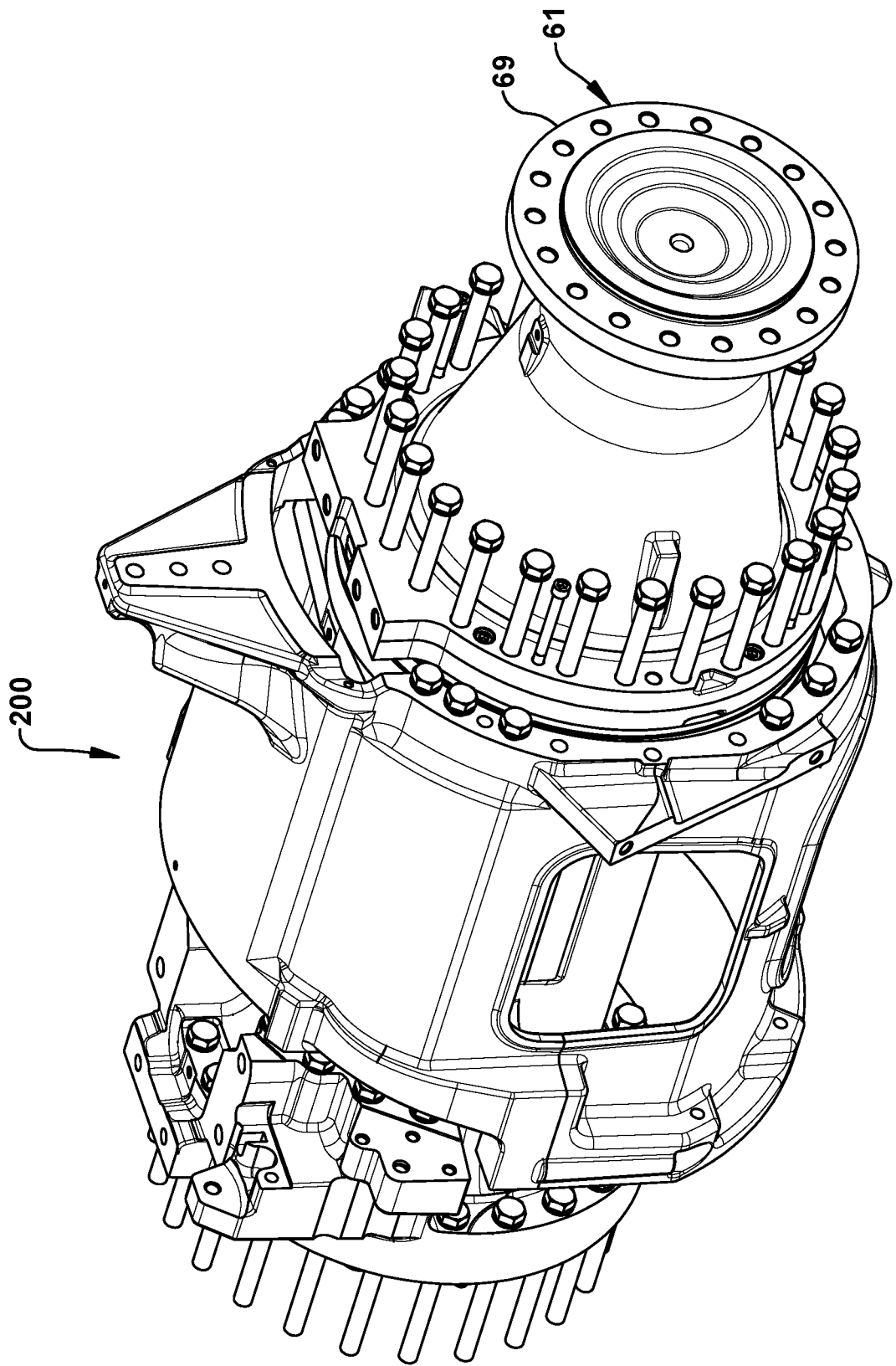
Figure 14:
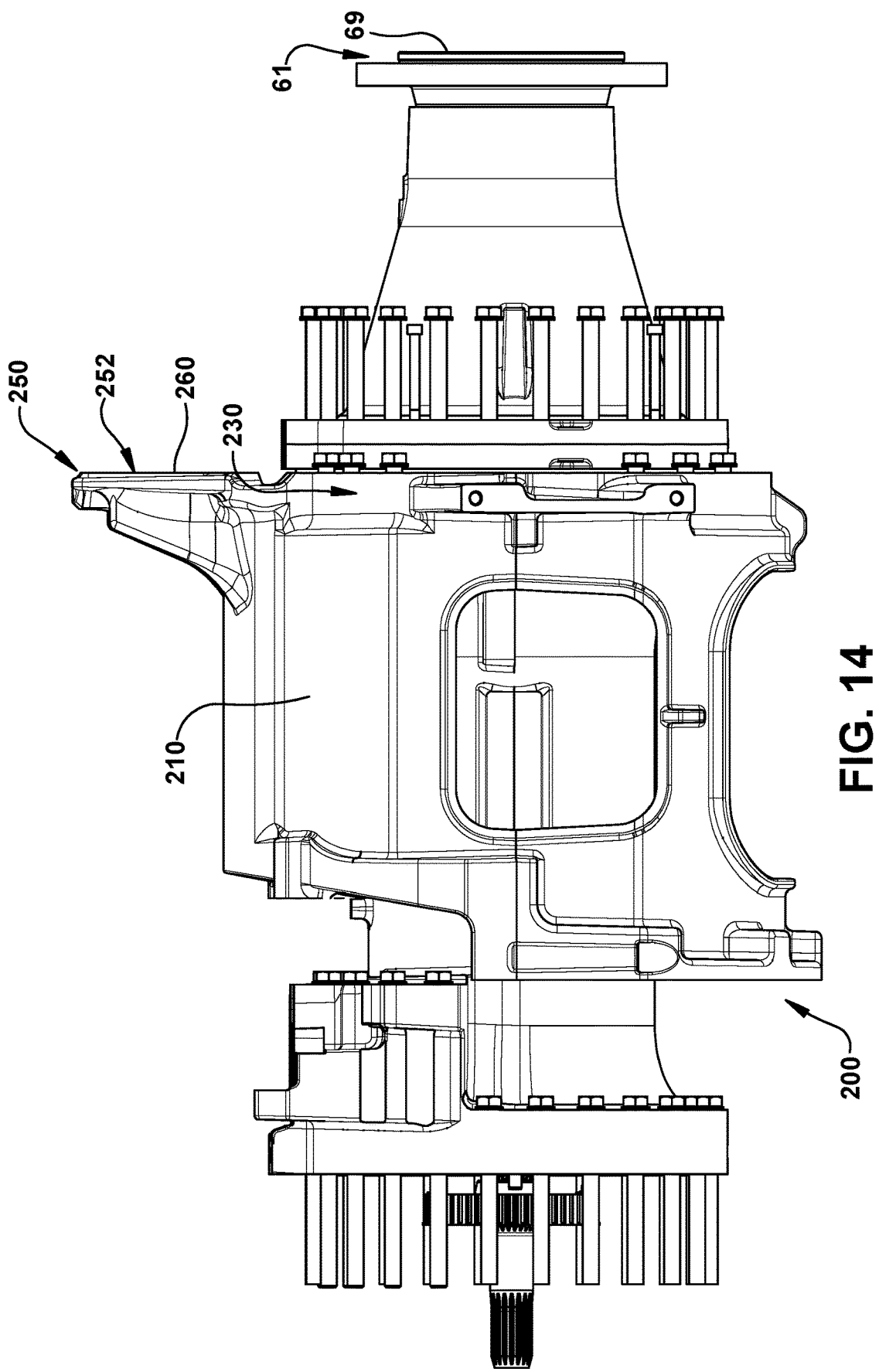
FIG. 14 is a side view of a commodity tank support device in accordance with an example embodiment mounted onto the end of an axle assembly of the work vehicle in accordance with an example embodiment and with the commodity tank removed for clarity.
Figure 15:
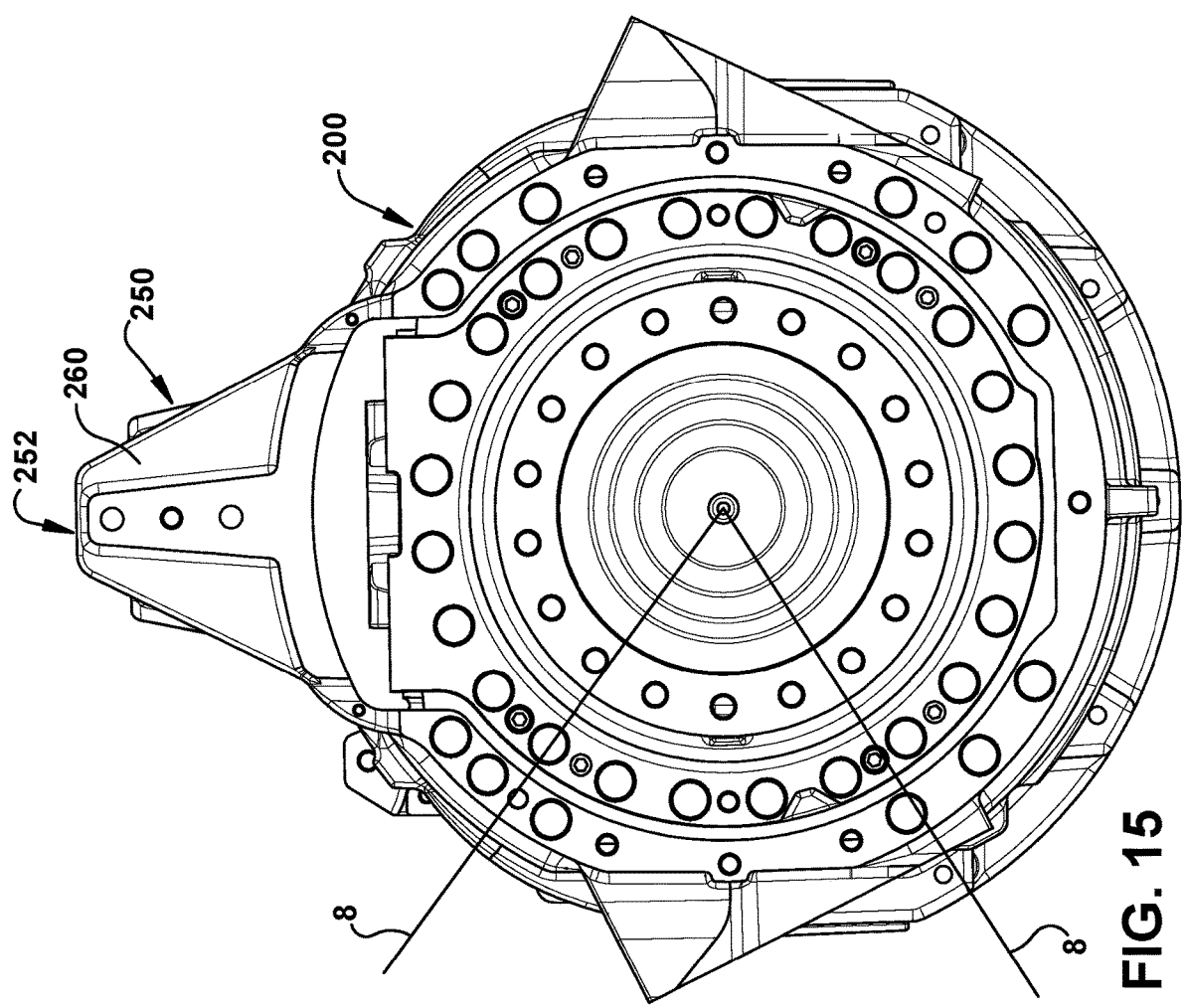
FIG. 15 is an end view of a commodity tank support device in accordance with an example embodiment mounted onto the end of an axle assembly of the work vehicle in accordance with an example embodiment and with the commodity tank removed for clarity.
Figure 16:
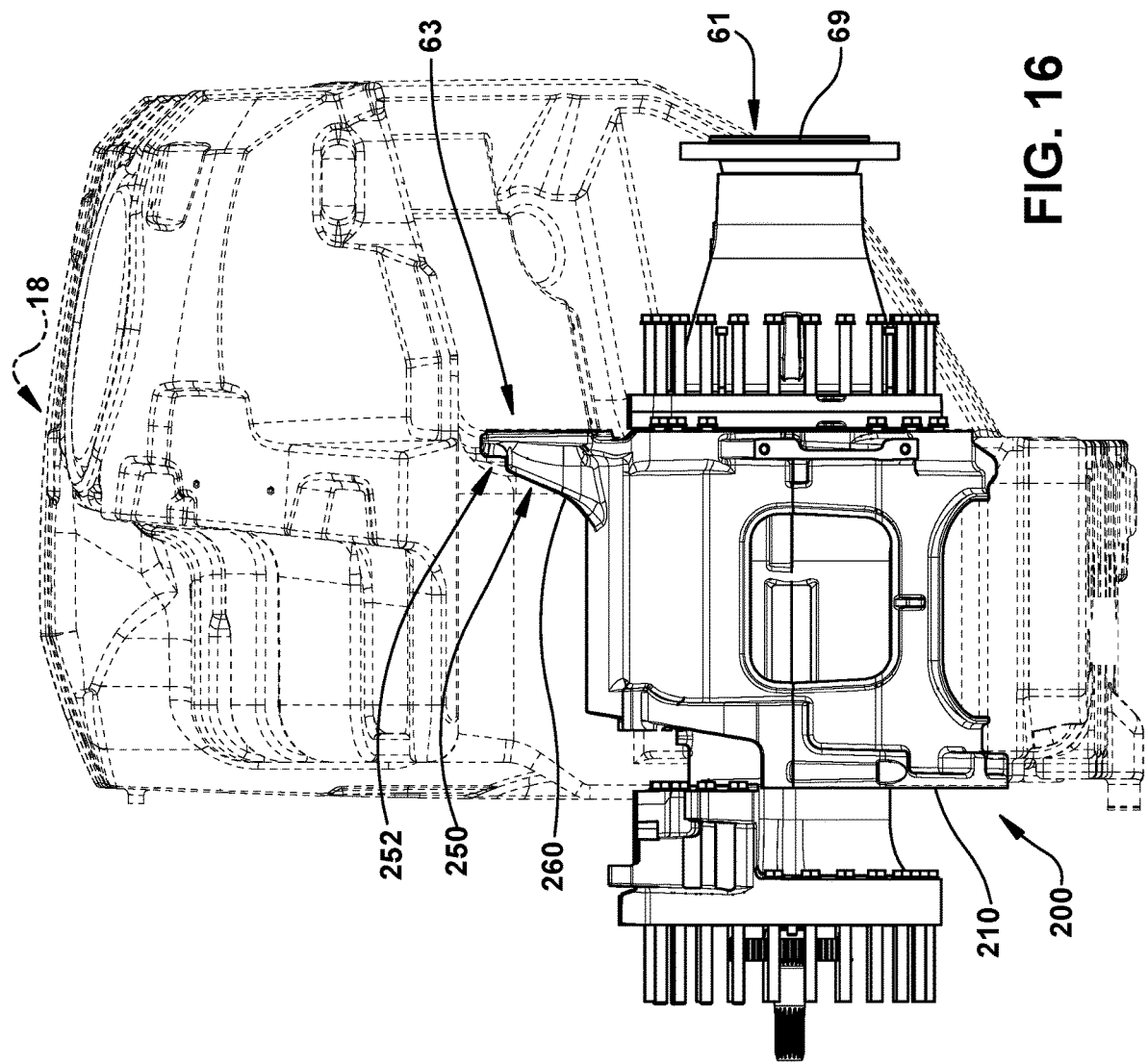
FIG. 16 is a front side elevation view corresponding with FIG. 3 of a commodity tank supported on a work vehicle by a support device in accordance with an embodiment of the present disclosure.

FIGS. 13a-13e are views showing steps in a method of mounting the commodity tank support device 200 of FIGS. 9 and 10 carrying the commodity tank 18 (removed from illustration for clarity) onto the end of an axle assembly 66 of the work vehicle in accordance with an example embodiment and with the commodity tank removed for clarity, and FIGS. 14 and 15 show side and end elevational views, respectively, of the commodity tank support device 200 fully mounted onto the end of an axle assembly 66 of the work vehicle in accordance with an example embodiment. In FIG. 13a, a drive axle assembly 66 containing the drive axle 60 of the tracked work vehicle 10 is provided. Further in FIG. 13a a tank support device 200 in accordance with an example embodiment is provided. Also in FIG. 13a, the tank support device 200 in accordance with an example embodiment is oriented with the general conformation of the drive axle assembly 66 such that the main body member longitudinal axis L of the main body member 220 of the main body portion 210 aligns with the axis D defined by the drive axle assembly 66 of the associated work vehicle 10. That is, the main body member longitudinal axis L of the main body member 220 of the main body portion 210 and the axis D defined by the drive axle assembly 66 of the associated work vehicle 10 are made to be coextensive such as by aligning the axes. In that way, the tank support device 200 may be simply and easily installed onto the drive axle assembly 66 using a basic sliding motion during assembly of the associated work vehicle thereby alleviating the need to provide an additional set of struts on the tank and/or multiple brackets or the like on the work vehicle that would otherwise make mounting the tank onto the work vehicle complicated and difficult to implement during the assembly process.

With the main body member longitudinal axis L of the main body member 220 of the main body portion 210 aligned with the axis D defined by the drive axle assembly 66 of the associated work vehicle 10, the tank support device 200 carrying the commodity tank 18 (removed from illustration for clarity) is slid onto the end of the drive axle assembly in FIG. 13b. In the relative position illustrated, the distal end 69 of the axle 61 is received in the elongate opening 212 of the main body portion 210 of the main body portion 210 of the commodity tank support device 200 in accordance with an example embodiment. In the example embodiment, the elongate opening 212 defined by the main body portion 210 extends along an axis A of the main body portion 210 and is configured to receive the end portion 64 of the drive axle assembly 66 of the associated work vehicle 10 extending through the opening.

In FIG. 13c, the axle assembly 66 and the main body portion 210 of the commodity tank support device 200 in accordance with an example embodiment are continued to be moved relative to each other in an overlapping fashion for the main body portion 210 of the commodity tank support device 200 to more fully surround the axle assembly 66. In the position illustrated, the axle mounting structure 67 on the end portion 64 of the drive axle assembly 66 of the associated work vehicle 10 is received in the elongate opening 212 defined by the main body portion 210.

In FIG. 13d, the axle assembly 66 and the main body portion 210 of the commodity tank support device 200 in accordance with an example embodiment are continued to be moved relative to each other in an overlapping fashion for the main body portion 210 of the commodity tank support device 200 to more fully surround the axle assembly 66 to a further extent. In the position illustrated, the distal end 69 of the axle 61 of the drive axle assembly 66 of the associated work vehicle 10 extends through the elongate opening 212 defined by the main body portion 210 of the commodity tank support device 200 and is thereby accessible for eventual attachment with the ground engaging members 16 of the associated vehicle 10.

In FIG. 13e the annular flat interface 244 (FIG. 8) of the tank support device 200 is in position for being fastened with the corresponding associated axle mounting structure 67 (FIG. 11) on the end portion 64 of the drive axle assembly 66 of the associated work vehicle 10. This is best shown in the partial cross-sectional view of FIG. 8 taken along line 8-8 in FIG. 16 of a commodity tank support device in accordance with an example embodiment mounted onto a distal end of an associated axle assembly of an associated work vehicle. FIG. 14 is a side view of a commodity tank support device in accordance with an example embodiment mounted onto the end of an axle assembly of the work vehicle in accordance with an example embodiment and with the commodity tank removed for clarity. FIG. 15 is an end view of a commodity tank support device in accordance with an example embodiment mounted onto the end of an axle assembly of the work vehicle in accordance with an example embodiment and with the commodity tank removed for clarity;

As described above, FIG. 16 is a front side elevation view corresponding with FIG. 3 of a commodity tank supported on a work vehicle by a support device in accordance with an embodiment of the present disclosure. As shown there, the associated work vehicle of the illustrated embodiment may include one or more commodity tank(s) 18 mounted or otherwise coupled to the work vehicle 10 by a corresponding one or more commodity support devices 200 of the illustrated embodiment. The one or more commodity tank(s) 18 are configured to store material, such as for application outside of the work vehicle 10 in a non-limiting example. The work vehicle may further utilize the commodity tank(s) 18 for storing water or other material for ballast, stability, or weight control. Each commodity tank 18 is configured to store fertilizer, herbicide, pesticide, water, fuel, or another nutrient, chemical, or other material for storage, utilization by the work vehicle 10, and/or dispensing at or onto a work area, such as a crop field to name a non-limiting example. The illustrated embodiment includes two commodity tanks 18 and two support devices 200 as mirror images of each other relative to a vertical plane extending through a central, longitudinal axis of the work vehicle 10. However, the two commodity tanks 18 and support devices of another embodiment are not mirror images of each other. Further, additional embodiments of the present disclosure may include either a single commodity tank 18 and support device 200 disposed on a side of the vehicle 10 or a commodity tank 18 and support device on both sides of the vehicle 10 and extending between the two sides of the work vehicle 10, such as behind or otherwise around the operator station 14. As will be appreciated, tank support devices formed in accordance with an example embodiment may be used to connect the pair of commodity tanks 18 illustrated with portions of the drive axle assembly of the work vehicle on sides of the distal ends 69 of the axle 60 opposite from the ground engaging structures 16. In that way, the left and right commodity tanks 18 illustrated may be installed onto the axle assemblies and inboard of the distal ends 69 of the axles during manufacture before the track assemblies 16 (FIG. 1) are installed onto the work vehicle, thereby saving time and costs by simplifying the manufacturing process.

As described above, FIG. 17 is a left side elevation view corresponding with FIG. 2 of a commodity tank supported on a work vehicle by a support device in accordance with an embodiment of the present disclosure.

As described above, FIG. 18 is a top plan view corresponding with FIG. 5 of a commodity tank supported on a work vehicle by a support device in accordance with an embodiment of the present disclosure.

As shown in the Figures and as described above, a work vehicle 10 is provided including a ground engaging member 16, a drive axle assembly 66, a commodity tank 18 including a commodity tank mounting structure 63, and a commodity tank support device 200 mounting the commodity tank 18 on an end portion 64 of the drive axle assembly 66 of the work vehicle 10. The drive axle assembly 66 includes an axle 61 having a distal end 69 selectively coupleable with the ground engaging member 16 for driving the ground engaging member 16 by the axle assembly 66. The commodity tank support device 200 includes a main body portion 210 and first and second mounting portions 230, 250. The main body portion 210 of the commodity tank support device 200 defines an elongate opening 212 extending along an axis A of the main body portion 210 and configured to receive the end portion 64 of the drive axle assembly 66 extending through the opening 212. The first mounting portion 230 of the commodity tank support device 200 defines an axle mounting portion 232 of the commodity tank support device 200. The axle mounting portion 232 includes an axle coupling member 240 configured for selective fastening with a corresponding axle mounting structure 67 on the end portion 64 of the drive axle assembly 66. The second mounting portion 250 of the commodity tank support device 200 defines a commodity tank mounting portion 252 of the commodity tank support device 200. The commodity tank mounting portion 252 includes a commodity tank coupling member 260 configured for selective fastening with the commodity tank mounting structure 63 of the commodity tank 18.

In accordance with an example embodiment, the main body portion 210 of the commodity tank support device 200 of the work vehicle 10 includes a substantially cylindrical main body member 220 defining a main body member longitudinal axis L, and the elongate opening 212 of the commodity tank support device 200 extends along the main body member longitudinal axis L of the main body member 220.

In accordance with an example embodiment, the elongate opening 212 of the commodity tank support device 200 of the work vehicle 10 is configured to receive the end portion 64 of the drive axle assembly 66 along the main body member longitudinal axis L of the main body member 220, and the main body member 220 of the commodity tank support device 200 completely surrounds the end portion 64 of the drive axle assembly 66 when the axle coupling member 240 is selectively fastened with the corresponding associated axle mounting structure 67 on the end portion 64 of the drive axle assembly 66.

In accordance with an example embodiment, the axle coupling member 240 of the commodity tank support device 200 of the work vehicle 10 defines a flat interface 242 in a plane substantially perpendicular to the main body member longitudinal axis L defined by the main body member 220.

In accordance with an example embodiment, the flat interface 242 defined by the axle coupling member 240 of the commodity tank support device 200 of the work vehicle 10 includes an annular flat interface 244 in the plane substantially perpendicular to the main body member longitudinal axis L defined by the main body member 220.

In accordance with an example embodiment, the main body member longitudinal axis L of the commodity tank support device 200 of the work vehicle 10 is substantially coextensive with an axis D defined by the drive axle assembly 66 of the associated work vehicle (10) when the axle coupling member 240 is selectively fastened with the corresponding associated axle mounting structure 67 on the end portion 64 of the drive axle assembly 66.

In accordance with an example embodiment, the axle mounting portion 232 of the first mounting portion 230 of the commodity tank support device 200 of the work vehicle 10 includes a single axle coupling member 246 defining an annular flat interface 248 in a plane substantially perpendicular to the main body member longitudinal axis L defined by the main body member 220.

Without in any way limiting the scope, interpretation, or application of the claims appearing below, the work vehicle 10 and the commodity tank 18 of one or more of the embodiments described herein provide a substantial amount of material storage while improving the maneuverability or other operative function of the work vehicle 10 by maintaining a desirable center of gravity of the work vehicle 10 equipped with the commodity tank(s) 18 supported by a tank support device 200 in accordance with an example embodiment. Further, the commodity tank 18 provides ballast control, improves stability, and/or increases traction of the work vehicle 10 when the commodity tank 18 is positioned in accordance with embodiments described herein because the weight of the commodity tank 18 and the material contained therein is generally centered over the drive axle 60, and such weight and positioning is generally controllable by increasing, decreasing, or displacing material in the commodity tank(s) 18. Even further, because the commodity tank 18 utilizes substantial space at an inboard location of the work vehicle 10, the commodity tank 18 and the work vehicle 10 improve operation of the work vehicle 10 by preventing unnecessary width, length, or other bulk being added to the work vehicle 10 with the addition of the commodity tank 18. The work vehicle 10, the commodity tank 18, and the tank support device 200 in accordance with an example embodiment further improve the ability for an operator to access the operator station 14 because the commodity tank 18 is located away from doors or other entry locations of the operator station 14. Even further, the work vehicle 10, the commodity tank 18, and the tank support device 200 in accordance with an example embodiment improve an operator's visibility from the operator station 14 because the commodity tank 18 is located away from the window 66. Even still further, the work vehicle 10, the commodity tank 18, and the tank support device 200 in accordance with an example embodiment make assembly of the commodity tank support device 200 onto the drive axle assembly 66 during manufacture of the associated work vehicle 10 fast and simple.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A commodity tank support device configured to mount an associated commodity tank of an associated work vehicle on an end portion of a drive axle assembly of the associated work vehicle having an axle rotatable relative to the drive axle assembly and being selectively coupleable with a ground engaging member driven by the axle, the commodity tank support device comprising:
    a main body portion defining an elongate opening extending along an axis of the main body portion and configured to receive the end portion of the drive axle assembly of the associated work vehicle extending through the opening, the main body portion comprising a substantially cylindrical main body member defining a main body member longitudinal axis, wherein the elongate opening extends through the main body member along the longitudinal axis;
    a first mounting portion defining an axle mounting portion of the commodity tank support device, the axle mounting portion comprising an axle coupling member configured for selective fastening with a corresponding associated axle mounting structure on the end portion of the drive axle assembly that is non-rotatable relative to the associated work vehicle; and
    a second mounting portion defining a commodity tank mounting portion of the commodity tank support device, the commodity tank mounting portion comprising a commodity tank coupling member configured for selective fastening with a corresponding associated commodity tank mounting structure of the commodity tank of the associated work vehicle,
    wherein the main body portion and the first and second mounting portions comprise a unitary construction.

2. The commodity tank support device according to claim 1, wherein:
    the elongate opening is configured to receive the end portion of the drive axle assembly of the associated work vehicle along the main body member longitudinal axis of the main body member; and
    the main body member completely surrounds the end portion of the drive axle assembly of the associated work vehicle when the axle coupling member is selectively fastened with the corresponding associated axle mounting structure on the end portion of the drive axle assembly of the associated work vehicle.

3. The commodity tank support device according to claim 1, wherein:
    the axle mounting portion of the first mounting portion comprises a single axle coupling member defining an annular flat interface in a plane substantially perpendicular to the main body member longitudinal axis defined by the main body member.

4. The commodity tank support device according to claim 1, wherein:
    the main body member longitudinal axis is substantially coextensive with an axis defined by the drive axle assembly of the associated work vehicle when the axle coupling member is selectively fastened with the corresponding associated axle mounting structure on the end portion of the drive axle assembly of the associated work vehicle.

5. The commodity tank support device according to claim 1, wherein:
the axle coupling member defines a flat interface in a plane substantially perpendicular to the main body member longitudinal axis defined by the main body member.

6. The commodity tank support device according to claim 5, wherein:
the flat interface defined by the axle coupling member comprises an annular flat interface in the plane substantially perpendicular to the main body member longitudinal axis defined by the main body member.

7. The commodity tank support device according to claim 5, wherein:
the main body member longitudinal axis is substantially coextensive with an axis defined by the drive axle assembly of the associated work vehicle when the axle coupling member is selectively fastened with the corresponding associated axle mounting structure on the end portion of the drive axle assembly of the associated work vehicle.

8. A work vehicle comprising:
a ground engaging member;
a drive axle assembly comprising an axle rotatable relative to the drive axle assembly and being selectively coupleable with the ground engaging member for driving the ground engaging member by the axle;
a commodity tank comprising a commodity tank mounting structure; and
a commodity tank support device mounting the commodity tank on an end portion of the drive axle assembly of the work vehicle, the commodity tank support device comprising:
a main body portion defining an elongate opening extending along an axis of the main body portion and configured to receive the end portion of the drive axle assembly extending through the opening, the main body portion comprising a substantially cylindrical main body member defining a main body member longitudinal axis, wherein the elongate opening extends through the main body member along the longitudinal axis;
a first mounting portion defining an axle mounting portion of the commodity tank support device, the axle mounting portion comprising an axle coupling member configured for selective fastening with a corresponding axle mounting structure on the end portion of the drive axle assembly that is nonrotatable relative to the associated work vehicle; and
a second mounting portion defining a commodity tank mounting portion of the commodity tank support device, the commodity tank mounting portion comprising a commodity tank coupling member configured for selective fastening with the commodity tank mounting structure of the commodity tank,
wherein the main body portion and the first and second mounting portions comprise a unitary construction.

9. The work vehicle according to claim 8, wherein:
the elongate opening of the commodity tank support device is configured to receive the end portion of the drive axle assembly along the main body member longitudinal axis of the main body member; and
the main body member of the commodity tank support device completely surrounds the end portion of the drive axle assembly when the axle coupling member is selectively fastened with the corresponding associated axle mounting structure on the end portion of the drive axle assembly.

10. The work vehicle according to claim 8, wherein:
the axle mounting portion of the first mounting portion of the commodity tank support device comprises a single axle coupling member defining an annular flat interface in a plane substantially perpendicular to the main body member longitudinal axis defined by the main body member.

11. The work vehicle according to claim 8, wherein:
the main body member longitudinal axis of the commodity tank support device is substantially coextensive with an axis defined by the drive axle assembly of the associated work vehicle when the axle coupling member is selectively fastened with the corresponding associated axle mounting structure on the end portion of the drive axle assembly.

12. The work vehicle according to claim 8, wherein:
the axle coupling member of the commodity tank support device defines a flat interface in a plane substantially perpendicular to the main body member longitudinal axis defined by the main body member.

13. The work vehicle according to claim 12, wherein:
the flat interface defined by the axle coupling member of the commodity tank support device comprises an annular flat interface in the plane substantially perpendicular to the main body member longitudinal axis defined by the main body member.

14. The work vehicle according to claim 12, wherein:
the main body member longitudinal axis of the commodity tank support device is substantially coextensive with an axis defined by the drive axle assembly of the associated work vehicle when the axle coupling member is selectively fastened with the corresponding associated axle mounting structure on the end portion of the drive axle assembly.

15. A method of mounting a commodity tank onto a work vehicle, the method comprising:
providing a commodity tank comprising commodity tank mounting structure;
providing a commodity tank support device comprising:
a main body portion defining an elongate opening extending along an axis of the main body portion and configured to receive an end portion of a drive axle assembly of the work vehicle extending through the opening, the main body portion comprising a substantially cylindrical main body member defining a main body member longitudinal axis, wherein the elongate opening extends through the main body member along the longitudinal axis;
a first mounting portion defining an axle mounting portion of the commodity tank support device, the axle mounting portion comprising an axle coupling member configured for selective fastening with a corresponding axle mounting structure on the end portion of the drive axle assembly that is nonrotatable relative to the work vehicle; and
a second mounting portion defining a commodity tank mounting portion of the commodity tank support device, the commodity tank mounting portion comprising a commodity tank coupling member configured for selective fastening with the commodity tank mounting structure of the commodity tank,
wherein the main body portion and the first and second mounting portions comprise a unitary construction;

moving the commodity tank support device and the drive axle assembly of the work vehicle relative to each other to receive the end portion of a drive axle assembly of the work vehicle extending through the opening of the main body portion;

fastening the axle mounting portion defined by the first mounting portion of the commodity tank support device with the corresponding axle mounting structure on the end portion of the drive axle assembly; and fastening the commodity tank coupling member of the commodity tank mounting portion of the commodity tank support device with the commodity tank mounting structure of the commodity tank.

16. The method according to claim 15, wherein:

the moving the commodity tank support device and the drive axle assembly of the work vehicle relative to each other comprises:

moving the commodity tank support device and the drive axle assembly of the work vehicle relative to each other so that the main body member of the commodity tank support device completely surrounds the end portion of the drive axle assembly when the axle coupling member is selectively fastened with the corresponding associated axle mounting structure on the end portion of the drive axle assembly.

17. The method according to claim 15, wherein:

the providing the commodity tank support device comprising providing a commodity tank support device having a main body portion comprising a substantially cylindrical main body member defining a main body member longitudinal axis; and the moving the commodity tank support device and the drive axle assembly of the work vehicle relative to each other comprises:

moving the commodity tank support device and the drive axle assembly of the work vehicle relative to each other with the main body member longitudinal axis of the commodity tank support device being substantially coextensive with an axis defined by the drive axle assembly of the work vehicle.

* * * * *